(12) United States Patent
Maheshwari

(10) Patent No.: US 9,883,543 B2
(45) Date of Patent: Jan. 30, 2018

(54) METHOD OF CONNECTING TO DEVICE AND APPARATUS FOR SUPPORTING WI-FI DIRECT FOR PERFORMING THE METHOD

(71) Applicant: S-PRINTING SOLUTION CO., LTD., Suwon-si, Gyeonggi-do (KR)

(72) Inventor: Naveen Maheshwari, Suwon-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days.

(21) Appl. No.: 14/928,274

(22) Filed: Oct. 30, 2015

(65) Prior Publication Data

US 2016/0128119 A1    May 5, 2016

(30) Foreign Application Priority Data

Nov. 5, 2014 (KR) .................. 10-2014-0152855

(51) Int. Cl.
 *H04W 4/00* (2009.01)
 *H04W 76/02* (2009.01)
 *H04W 4/08* (2009.01)

(52) U.S. Cl.
 CPC ......... *H04W 76/023* (2013.01); *H04W 4/008* (2013.01); *H04W 4/08* (2013.01)

(58) Field of Classification Search
 CPC ...... H04W 76/023; H04W 4/008; H04W 4/08
 USPC ....................................................... 370/329
 See application file for complete search history.

(56) References Cited

U.S. PATENT DOCUMENTS

| | | | | |
|---|---|---|---|---|
| 5,058,201 A | * | 10/1991 | Ishii ..................... | H04W 60/00 455/447 |
| 2009/0064299 A1 | * | 3/2009 | Begorre ................ | H04W 12/12 726/7 |
| 2011/0034178 A1 | * | 2/2011 | Mehta ................... | G01S 5/0236 455/456.1 |
| 2011/0182207 A1 | * | 7/2011 | Naito .................... | H04W 4/08 370/254 |
| 2013/0100486 A1 | | 4/2013 | Mccoog et al. | |
| 2013/0229944 A1 | * | 9/2013 | Montemurro ........ | H04W 4/206 370/254 |
| 2014/0075523 A1 | * | 3/2014 | Tuomaala ............ | H04L 63/083 726/6 |
| 2014/0223019 A1 | * | 8/2014 | McCann .............. | H04W 8/186 709/228 |
| 2014/0355047 A1 | | 12/2014 | Lee et al. | |
| 2015/0195710 A1 | * | 7/2015 | Bar-Niv ............... | H04W 12/08 726/23 |
| 2016/0255673 A1 | * | 9/2016 | Yasuda ................ | H04W 84/20 |

* cited by examiner

*Primary Examiner* — Sai-Ming Chan
(74) *Attorney, Agent, or Firm* — Staas & Halsey LLP

(57) ABSTRACT

A method of performing a Wi-Fi Direct connection of a mobile device, including: determining a first device with which Wi-Fi Direct connection is to be performed; determining whether the mobile device has been Wi-Fi Direct connected to the first device; and when the mobile device has been Wi-Fi Direct connected to the first device, performing a Wi-Fi Direct connection to the first device based on stored connection information, wherein when the mobile device is Wi-Fi Direct connected to the first device, the connection information is automatically stored.

20 Claims, 33 Drawing Sheets

FIG. 12B

| JOB CATEGORY LOOKUP TABLE ||
|---|---|
| JOB | CATEGORY |
| TRANSMITTING PRINT JOB | IMPORTANT |
| SCAN JOB | IMPORTANT |
| TRANSMITTING FAX JOB | IMPORTANT |
| TRNASMITTING REQUEST TO CHANGE PRINT SETTING | IMPORTANT |
| IDLE STATE (STATE IN WHICH NO OPERATION IS PERFORMED) | NOT IMPORTANT |
| CHECKING STATE OF PRINTER | NOT IMPORTANT |

METHOD OF CONNECTING TO DEVICE AND APPARATUS FOR SUPPORTING WI-FI DIRECT FOR PERFORMING THE METHOD

RELATED APPLICATION

This application claims the benefit of Korean Patent Application No. 10-2014-0152855, filed on Nov. 5, 2014, in the Korean Intellectual Property Office, the disclosure of which is incorporated herein in its entirety by reference.

BACKGROUND

1. Field

One or more exemplary embodiments relate to a method of performing a Wi-Fi direct connection to a device.

2. Description of the Related Art

According to the related art, Wi-Fi is frequently used to transmit or receive data between devices. When using Wi-Fi, a device first connects to an access point (AP) and then, connects to a device that is to be connected and belongs to a connected network by using an IP address to thereby transmit or receive data. However, it is difficult to transmit or receive data between devices because an AP has to be used, whether the device to be connected to and the AP belong to the same network has to be found out, and an IP address has to be found out.

Accordingly, methods of connecting devices using a peer to peer (P2P) method such as Bluetooth or Wi-Fi Direct have been developed to conveniently transmit or receive data between devices. In particular, Wi-Fi Direct has high data transmission and reception speeds and a broad coverage and is thus widely used by users.

SUMMARY

One or more exemplary embodiments include a method of automatically performing a Wi-Fi Direct connection to a device that was connected before via Wi-Fi Direct, and a device for performing the method.

Additional aspects will be set forth in part in the description which follows and, in part, will be apparent from the description, or may be learned by practice of the presented exemplary embodiments.

According to one or more exemplary embodiments, a method of performing a Wi-Fi Direct connection of a mobile device, includes: determining a first device with which Wi-Fi Direct connection is to be performed; determining whether the mobile device has been Wi-Fi Direct connected to the first device before; and when the mobile device has been Wi-Fi Direct connected to the first device, performing a Wi-Fi Direct connection to the first device based on stored connection information, wherein when the mobile device is Wi-Fi Direct connected to the first device, the connection information is automatically stored.

The performing a Wi-Fi Direct connection to the first device based on the stored connection information may include: determining a group owner by sending a group owner negotiation request to the first device; and performing a Wi-Fi Direct connection to the first device according to the determining.

The connection information may include at least one of a Wi-Fi Direct MAC address and a Wi-Fi Direct personal identification number (PIN).

The determining a first device with which Wi-Fi Direct connection is to be performed may include: displaying a list including a plurality of devices; and receiving a user input for selecting a first device with which Wi-Fi Direct connection is to be performed, among a plurality of devices included in the list.

When the mobile device has been Wi-Fi Direct connected to the first device, the performing a Wi-Fi Direct connection to the first device based on the stored connection information may include: when Wi-Fi Direct connection to the determined first device is not possible, determining a second device with which Wi-Fi Direct connection is to be performed; and performing a Wi-Fi Direct connection to the second device based on Wi-Fi Direct connection information about the second device, wherein when the mobile device is Wi-Fi Direct connected to the second device, connection information about the second device is automatically stored.

The determining a first device with which Wi-Fi Direct connection is to be performed may include: determining a current position of the mobile device; determining a device adjacent to the determined current position of the mobile device; and determining the device adjacent to the determining current position of the mobile device as the first device with which Wi-Fi Direct connection is to be performed.

Position information of the first device may be stored together with the stored connection information when Wi-Fi Direct connection to the first device is performed, and wherein the determining a device adjacent to the determined current position of the mobile device may include determining a device adjacent to the current position of the mobile device based on position information of the first device.

The determining a first device with which Wi-Fi Direct connection is to be performed may include, when a predetermined application is executed, determining a device, to which Wi-Fi Direct connection is performed during execution of the predetermined application before, as the first device with which Wi-Fi Direct connection is to be performed; and when the mobile device is Wi-Fi Direct connected to the first device while the predetermined application is being executed, the connection information may be automatically stored.

When the mobile device is Wi-Fi Direct connected to the first device, information about an identifier of the first device and a type of the performed connection may be stored, and the determining a first device with which Wi-Fi Direct connection is to be performed may include determining the first device based on the information about the identifier of the first device and the type of the performed connection.

The stored connection information may be obtained from a near field communication (NFC) tag or input by a user.

According to one or more exemplary embodiments, a mobile device supporting Wi-Fi Direct, includes: a storage unit for storing connection information; a connection information management unit for automatically storing the connection information in the storage unit when the mobile device is Wi-Fi Direct connected to a first device; a wireless connection unit for wirelessly connecting to an external device; and a controller for determining the first device with which Wi-Fi Direct connection is to be performed, determining whether the determined first device has been connected before, and controlling the wireless connection unit such that Wi-Fi Direct connection to the first device is performed based on connection information stored in the storage unit.

The connection information may include at least one of a Wi-Fi Direct MAC address and a Wi-Fi Direct personal identification number (PIN).

The mobile device may further include a user interface unit that displays a list including a plurality of devices and receives a user input for selecting the first device with which Wi-Fi Direct connection is to be performed, among a plurality of devices included in the list.

When Wi-Fi Direct connection to the first device is not possible, the controller may determine a second device with which Wi-Fi Direct connection is to be performed, control the wireless connection unit such that Wi-Fi Direct connection to the second device is performed based on Wi-Fi Direct connection information about the second device, wherein when the mobile device is Wi-Fi Direct connected to the second device, the connection information management unit automatically stores connection information about the second device in the storage unit.

The controller may determine a current position of the mobile device supporting Wi-Fi Direct, determine a device adjacent to the determined current position of the mobile device, and determine the device adjacent to the determined current position of the mobile device as a first device with which Wi-Fi Direct connection is to be performed.

When Wi-Fi Direct connection to the first device is performed, the connection information management unit may store position information of the first device with the connection information, and the controller may determine a device adjacent to the determined current position of the mobile device based on the position information of the first device.

When a predetermined application is being executed, the controller may determine a device, to which Wi-Fi Direct connection was performed during previous execution of the predetermined application, as the first device, wherein when the mobile device is Wi-Fi Direct connected to the first device during execution of the predetermined application, the connection information management unit automatically stores the connection information in the storage unit.

When the mobile device is Wi-Fi Direct connected to the first device during execution of the predetermined application, the connection information management unit may store information about an identifier of the first device and a type of the performed connection in the storage unit, together with the connection information, and the controller may determine the first device based on the information about the identifier of the first device and the type of the performed connection.

The stored connection information may be information that is obtained from an NFC tag or that is input by a user to the mobile device.

According to one or more exemplary embodiments, a computer-readable recording medium having embodied thereon a computer program for executing the method described above is included.

BRIEF DESCRIPTION OF THE DRAWINGS

These and/or other aspects will become apparent and more readily appreciated from the following description of the exemplary embodiments, taken in conjunction with the accompanying drawings in which:

FIGS. 12A and 12B are diagrams for explaining a process of determining a device to disconnect from an image forming apparatus based on connection state information, according to an embodiment;

DETAILED DESCRIPTION

Figure 1:
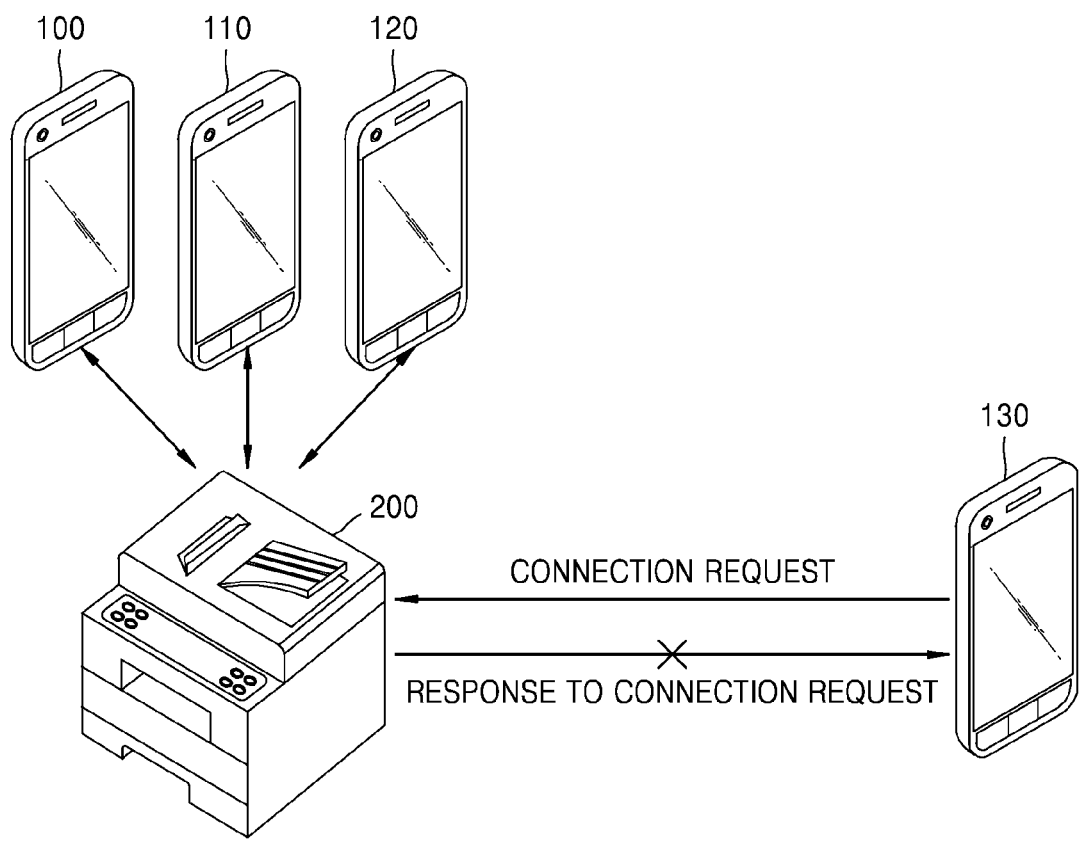
FIG. 1 is a diagram for explaining a process in which a device transmits a Wi-Fi Direct connection request to an image forming apparatus to be connected to the image forming apparatus.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

For clear description of features of the embodiments, description of details that are well known to one of ordinary skill in the art will be omitted.

When a device sends a connection request to an image forming apparatus via Wi-Fi Direct, if a maximum number of connectable devices are already connected to the image forming apparatus, the connection request is denied. In particular, even though the already connected devices are not performing any job via connection to the image forming apparatus, a connection request to other devices is denied just because of the connectable devices that are already connected to the image forming apparatus.

According to an embodiment, a method of connecting other devices based on connection state information of already connected devices if a maximum number of connectable devices are connected to an image forming apparatus and an image forming apparatus for performing the method are provided.

FIG. 1 is a diagram for explaining a process in which a device transmits a Wi-Fi Direct connection request to an image forming apparatus to be connected to the image forming apparatus.

Referring to FIG. 1, devices 100, 110, and 120 are already connected to an image forming apparatus 200 through a connection procedure. The devices 100, 110, and 120 include various devices whereby wireless communication is possible, such as a portable terminal, a laptop computer, or a tablet.

In detail, the image forming apparatus 200 supports Wi-Fi Direct. Thus, the image forming apparatus 200 is connected to the three devices 100, 110, and 120 through a connection procedure using Wi-Fi Direct. In this regard, a user may want to perform important jobs such as printing, scanning, or faxing by connecting to the image forming apparatus 200 by using a device 130.

The user transmits a Wi-Fi Direct connection request to the image forming apparatus 200 by using the device 130. The image forming apparatus 200 receives the Wi-Fi Direct connection request. The image forming apparatus 200 determines whether a maximum number of connectable devices are connected. According to the present embodiment, it is assumed that a maximum of three devices can be connected to the image forming apparatus 200 via Wi-Fi Direct. The image forming apparatus 200 determines that the three devices 100, 110, and 120 are connected to the image forming apparatus 200. As three devices are already connected to the image forming apparatus 200, the image forming apparatus 200 determines that no more devices can be connected to the image forming apparatus 200. Thus, the image forming apparatus 200 transmits to the device 130 a message informing that the connection request is denied and ends the procedure of connecting to the device 130.

Here, even though the devices 100, 110, and 120 are not performing any job via connection to the image forming apparatus 200 or are performing unimportant jobs, the user of the device 130 is not able to perform important jobs such as printing, scanning, or faxing as connection is denied.

Figure 2:
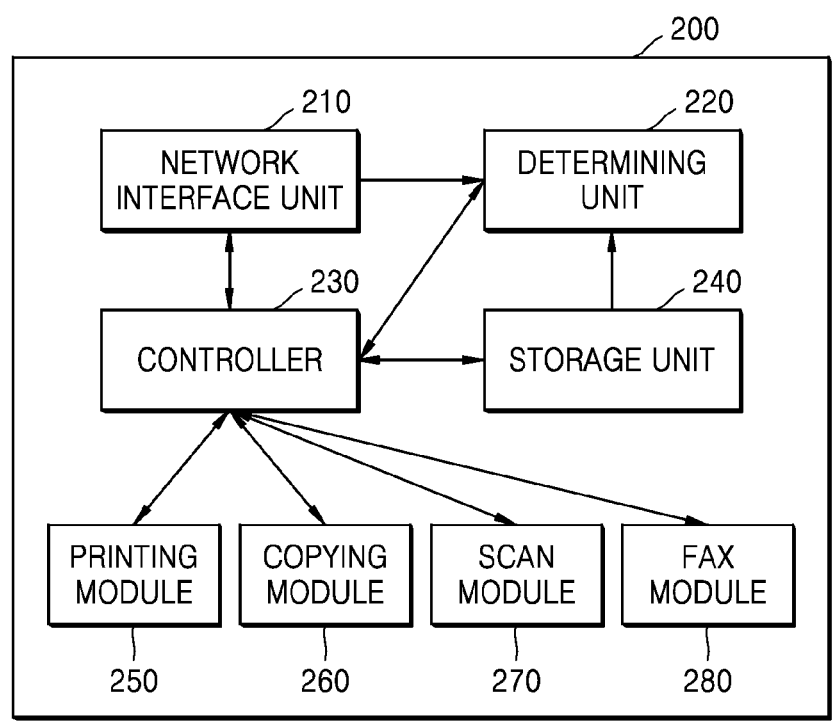
FIG. 2 illustrates an image forming apparatus according to an embodiment.

FIG. 2 illustrates an image forming apparatus 200 according to an embodiment.

Referring to FIG. 2, the image forming apparatus 200 includes a network interface unit 210, a determining unit 220, a controller 230, a storage unit 240, a printing module 250, a copying module 260, a scan module 270, and a fax module 280.

When the image forming apparatus 200 according to an embodiment receives a Wi-Fi Direct connection request from an external device, the image forming apparatus 200 determines whether a maximum number of connectable devices are connected, and when it is determined that a maximum number of connectable devices are connected, the image forming apparatus 200 determines devices to disconnect therefrom, based on connection state information of the connected devices, disconnects the devices that are determined to be disconnected therefrom, and connects to the external device.

The network interface unit 210 receives a Wi-Fi Direct connection request from an external device. Also, the network interface unit 210 may connect to the external device in response to the connection request.

The determining unit 220 determines whether a maximum number of connectable devices are connected to the image forming apparatus 200. For example, if up to three devices can be connected to the image forming apparatus 200 via Wi-Fi Direct, the image forming apparatus 200 determines whether three devices are currently connected thereto.

When it is determined that a maximum number of connectable devices are connected to the image forming apparatus 200, the determining unit 220 determines devices to disconnect therefrom, among the connected devices, based on connection state information stored in the storage unit 240. The connection state information refers to information indicating a connection state between the image forming apparatus 200 and devices, and in detail, information that includes at least one of time when a device is connected to the image forming apparatus 200 and content of jobs that are performed via connection to the image forming apparatus 200. Examples of jobs performed via connection to the image forming apparatus 200 may include at least one of jobs that are not temporarily performed by connecting to the image forming apparatus 200, a printing job, a job of checking a printing state, and a job of setting conditions related to printing. The determining unit 220 may determine a device connected to the image forming apparatus 200 for a longest time, as a device to be disconnected therefrom. Alternatively, the determining unit 220 may determine a device that performs a job having low priority via the image forming apparatus 200, as a device to be disconnected therefrom.

The image forming apparatus 200 may include a job priority setting unit (not shown). The job priority setting unit may preset a job content of a low priority, which is to be performed via connection to the image forming apparatus 200. For example, the job priority setting unit may set, as a low-priority job, a job that is temporarily performed not via connection to an image forming apparatus or a job of checking a printing state via the image forming apparatus 200. The determining unit 220 may determine a device that performs a low-priority job that is set by the job priority setting unit, as a device to be disconnected therefrom.

The controller 230 may control the network interface unit 210 to disconnect the device determined by the determining unit 220 as a device to be disconnected therefrom and connect to the external device. Also, the controller 230 may control the storage unit 240 to update connection state information stored in the storage unit 240 based on the connection request received from connected devices or exchanged data and store the updated connection state information therein.

The image forming apparatus 200 may include a display unit (not shown). The display unit may display a message. When it is determined that there is no device to be disconnected therefrom, the controller 230 may control the display unit to display a message informing that there is no device to be disconnected therefrom.

Figure 3:
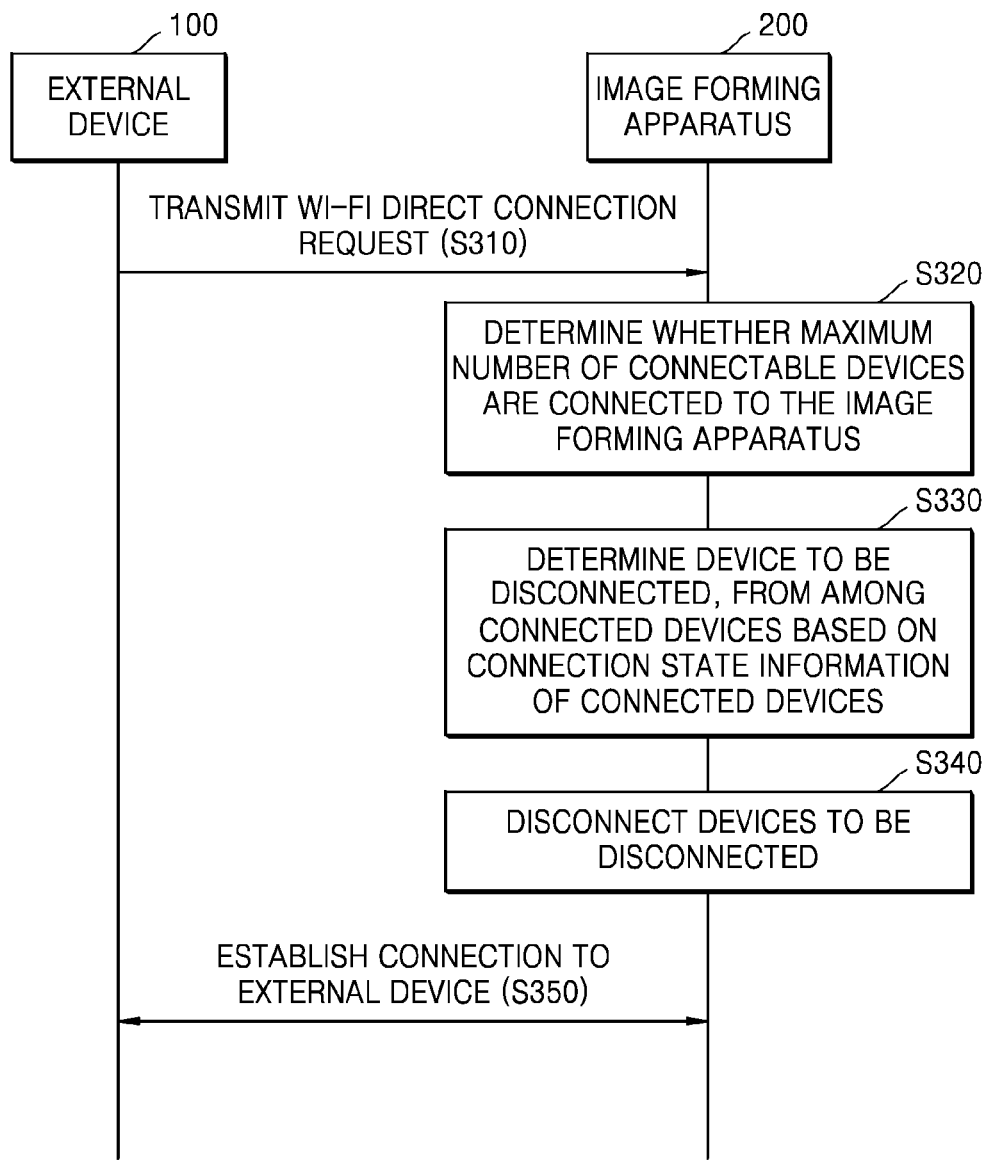
FIG. 3 is a diagram for explaining a method of connecting an external device to an image forming apparatus, according to an embodiment.

FIG. 3 is a diagram for explaining a method of connecting an external device to an image forming apparatus, according to an embodiment.

Referring to FIG. 3, in operation S310, the external device 100 transmits a Wi-Fi Direct connection request to the image forming apparatus 200.

In operation S320, when the image forming apparatus 200 receives the Wi-Fi Direct connection request from the external device 100, the image forming apparatus 200 determines whether a maximum number of connectable devices are connected to the image forming apparatus 200.

In operation S330, if it is determined that a maximum number of connectable devices are connected to the image forming apparatus 200, the image forming apparatus 200 determines a device to be disconnected among the connected devices, based on connection state information of the connected devices.

In operation S340, the image forming apparatus 200 disconnects the device determined to be disconnected therefrom.

In operation S350, the image forming apparatus 200 establishes a connection to the external device 100. In detail, the image forming apparatus 200 transmits a response to the Wi-Fi Direct connection request transmitted by the external device 100 to be connected to the external device 100.

Figure 4:
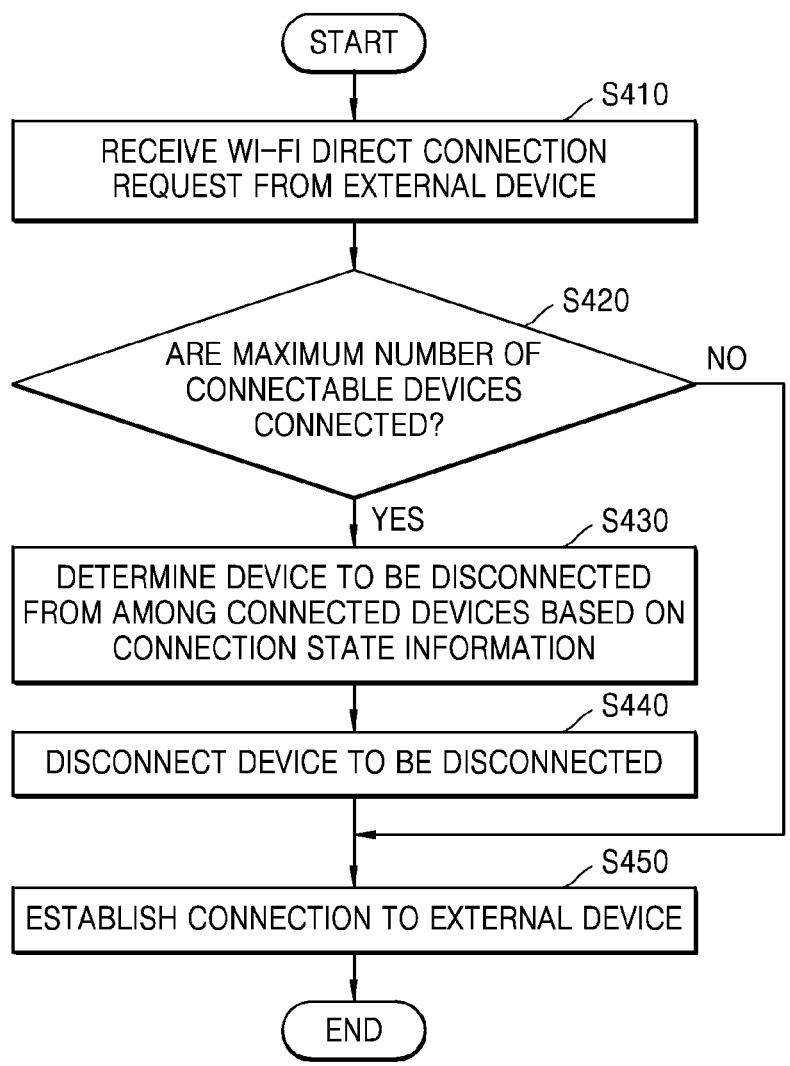
FIG. 4 is a flowchart of a method of connecting an external device to an image forming apparatus, according to an embodiment.

FIG. 4 is a flowchart of a method of connecting an external device to an image forming apparatus, according to an embodiment;

In operation S410, the image forming apparatus 200 receives a Wi-Fi Direct connection request from the external device 100.

In operation S420, the image forming apparatus 200 determines whether a maximum number of connectable devices are connected to the image forming apparatus 200.

In operation S430, if it is determined that a maximum number of connectable devices are connected to the image forming apparatus 200, the image forming apparatus 200 determines a device to be disconnected among the connected devices, based on connection state information of the connected devices.

In operation S440, the image forming apparatus 200 disconnects the device determined to be disconnected therefrom.

In operation S450, if it is determined that a maximum number of connectable devices are not connected to the image forming apparatus 200, the image forming apparatus 200 establishes a connection to the external device 100. If it is determined that a maximum number of connectable devices are connected to the image forming apparatus 200, the image forming apparatus 200 disconnects a device determined to be disconnected, in operation S440 and then, establishes a connection to the external device 100.

Figure 5:
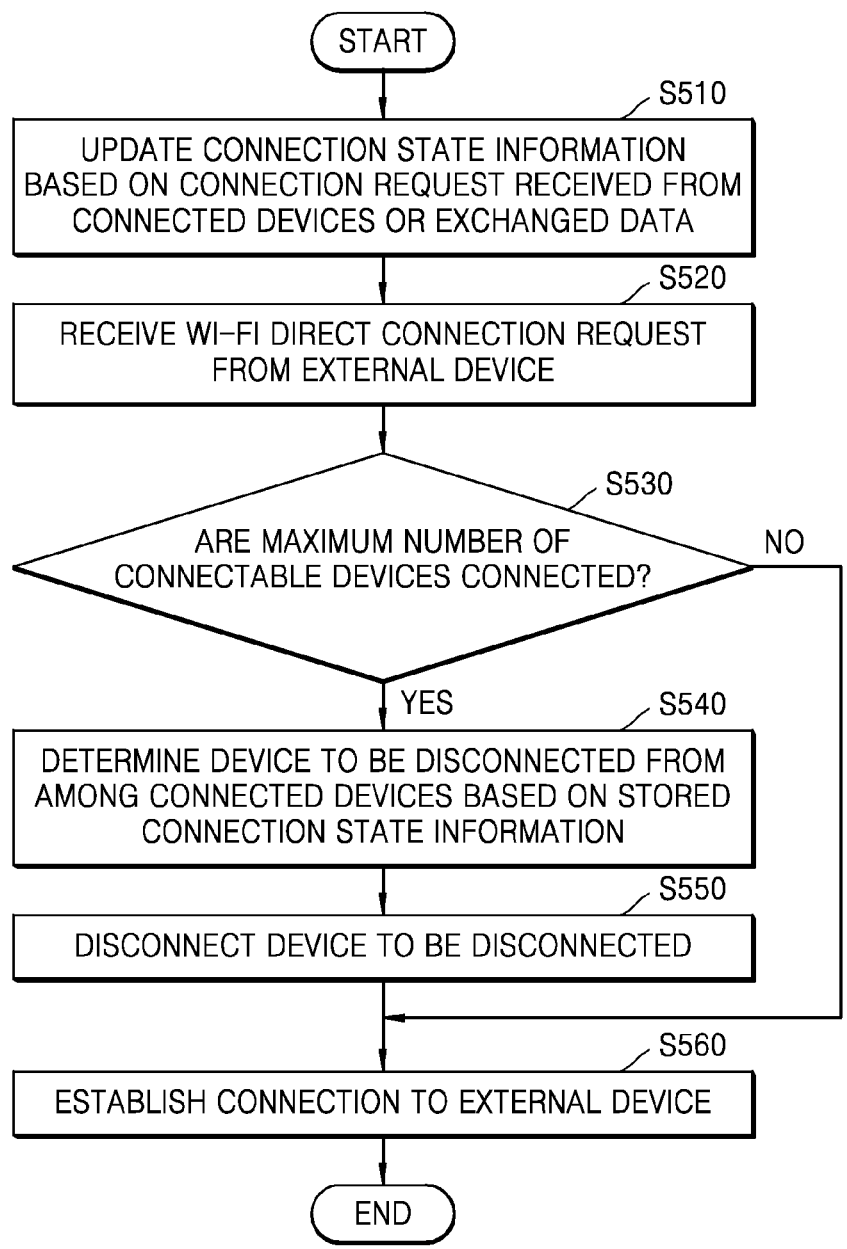
FIG. 5 is a flowchart of a method of connecting an external device to an image forming apparatus, according to another embodiment.

FIG. 5 is a flowchart of a method of connecting an external device to an image forming apparatus according to another embodiment.

In operation S510, the image forming apparatus 200 updates connection state information based on a connection request received from connected devices or exchanged data with the connected devices.

In operation S520, the image forming apparatus 200 receives a Wi-Fi Direct connection request from an external device.

In operation S530, the image forming apparatus 200 determines whether a maximum number of connectable devices are connected to the image forming apparatus 200.

In operation S540, if it is determined that a maximum number of connectable devices are connected to the image forming apparatus 200, the image forming apparatus 200 determines a device to be disconnected among the connected devices, based on the stored connection state information.

In operation S550, the image forming apparatus 200 disconnects the device determined to be disconnected therefrom.

In operation S560, if it is determined that a maximum number of connectable devices are not connected to the image forming apparatus 200, the image forming apparatus 200 establishes a connection to the external device. If it is determined that a maximum number of connectable devices are connected to the image forming apparatus 200, the image forming apparatus 200 disconnects the device determined to be disconnected therefrom in operation S550 and then, establishes a connection to the external device.

Figure 6:
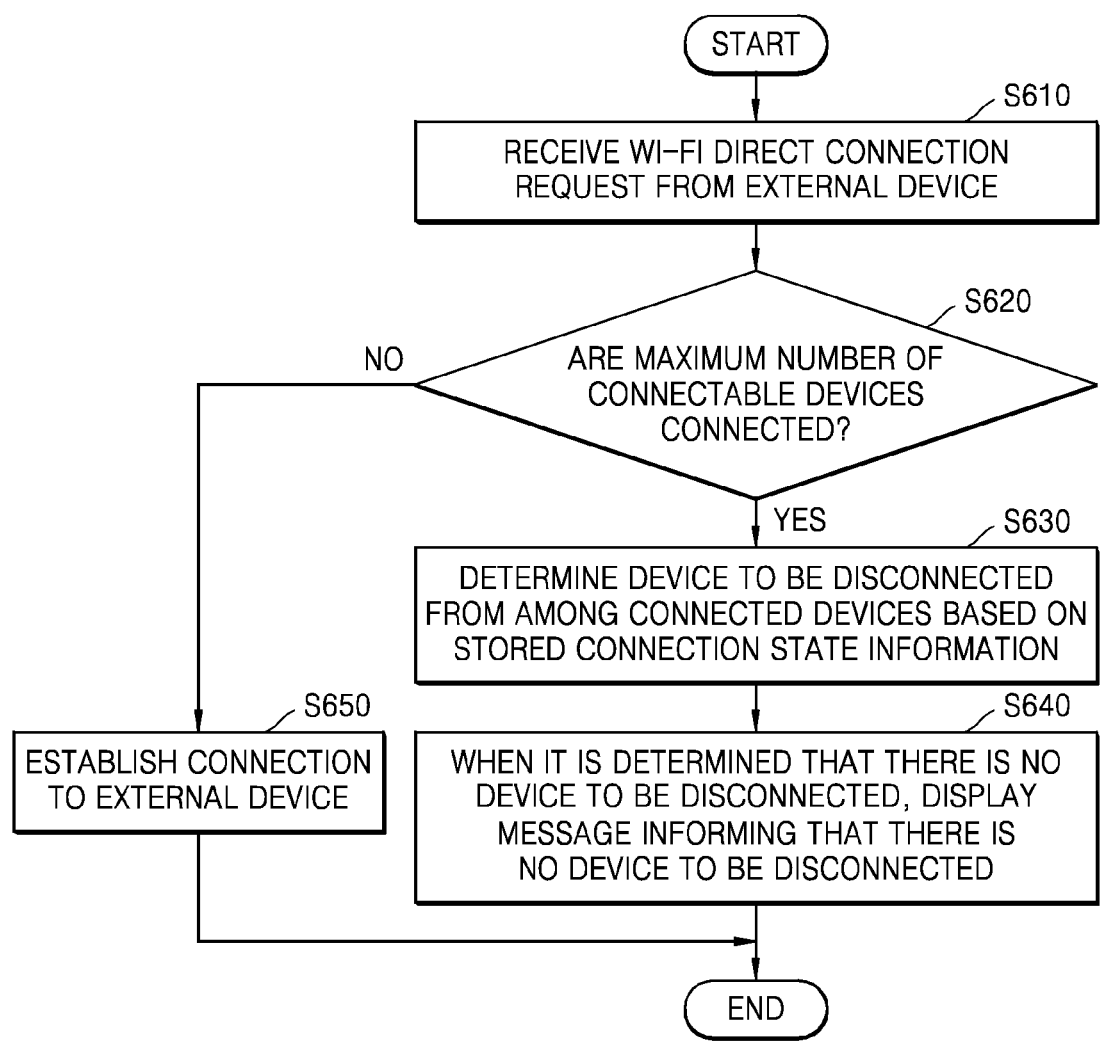
FIG. 6 is a flowchart of a method of connecting an external device to an image forming apparatus, according to another embodiment.

FIG. 6 is a flowchart of a method of connecting an external device to an image forming apparatus 200, according to another embodiment.

In operation S610, the image forming apparatus 200 receives a Wi-Fi Direct connection request from an external device.

In operation S620, the image forming apparatus 200 determines whether a maximum number of connectable devices are connected to the image forming apparatus 200.

In operation S630, if it is determined that a maximum number of connectable devices are connected to the image forming apparatus 200, the image forming apparatus 200 determines a device to be disconnected among the connected devices, based on connection state information.

In operation S640, if it is determined that there is no device to be disconnected from the image forming apparatus 200, the image forming apparatus 200 displays a message informing that there is no device to be disconnected therefrom.

In operation S650, if it is determined that a maximum number of connectable devices are not connected to the image forming apparatus 200, the image forming apparatus 200 establishes a connection to the external device.

Figure 7:
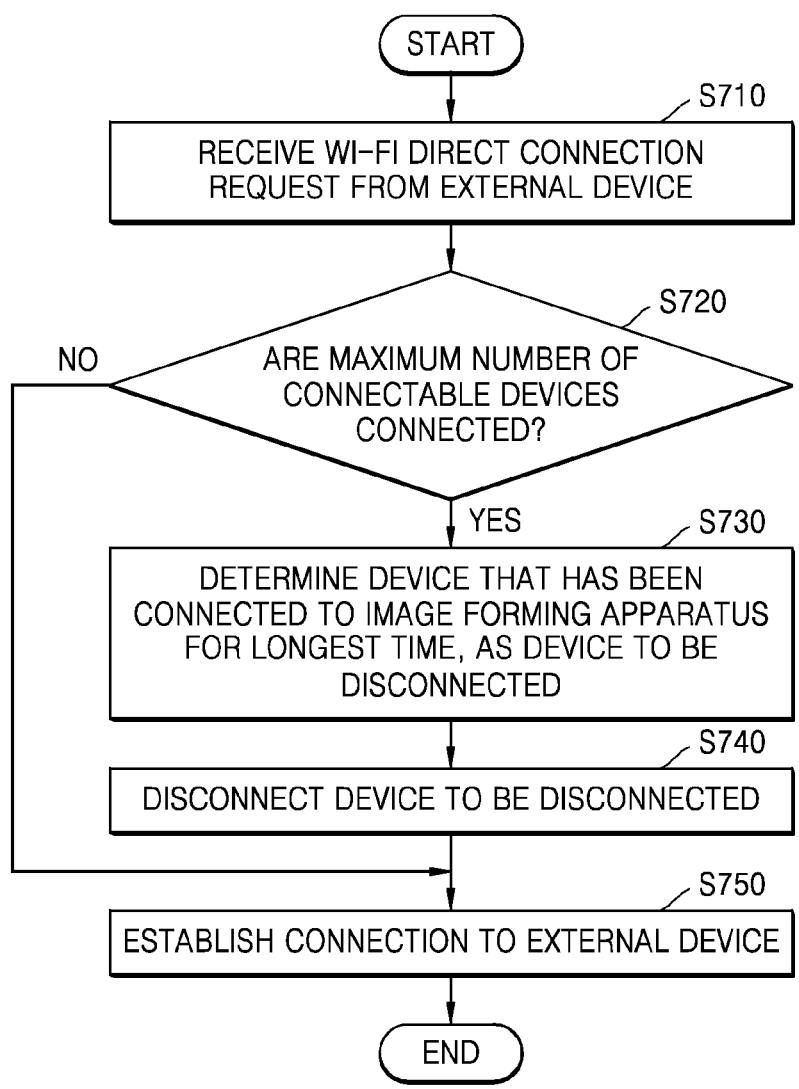
FIG. 7 is a flowchart of a method of connecting an external device to an image forming apparatus, according to another embodiment.

FIG. 7 is a flowchart of a method of connecting an external device to an image forming apparatus 200, according to another embodiment.

In operation S710, the image forming apparatus 200 receives a Wi-Fi Direct connection request from an external device.

In operation S720, the image forming apparatus 200 determines whether a maximum number of connectable devices are connected to the image forming apparatus 200.

In operation S730, if it is determined that a maximum number of connectable devices are connected to the image forming apparatus 200, the image forming apparatus 200 determines a device that has been connected to the image forming apparatus 200 for the longest time, as a device to be disconnected therefrom.

In operation S740, the image forming apparatus 200 disconnects the device determined to be disconnected therefrom.

In operation S750, if it is determined that a maximum number of connectable devices are not connected to the image forming apparatus 200, the image forming apparatus 200 establishes a connection to the external device. If it is determined that a maximum number of connectable devices are connected to the image forming apparatus 200, the image forming apparatus 200 disconnects the device determined to be disconnected therefrom in operation S740 and then, establishes a connection to the external device.

Figure 8:
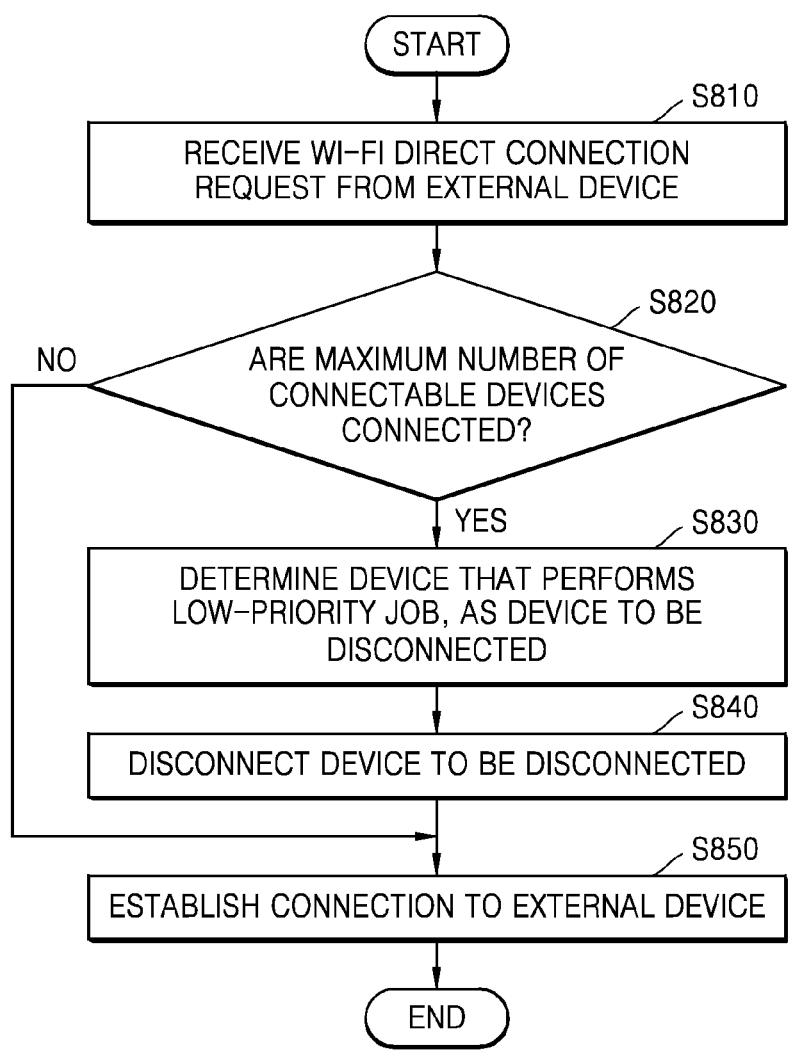
FIG. 8 is a flowchart of a method of connecting an external device to an image forming apparatus, according to another embodiment.

FIG. 8 is a flowchart of a method of connecting an external device to an image forming apparatus 200, according to another embodiment.

In operation S810, the image forming apparatus 200 receives a Wi-Fi Direct connection request from an external device.

In operation S820, the image forming apparatus 200 determines whether a maximum number of connectable devices are connected to the image forming apparatus 200.

In operation S830, if it is determined that a maximum number of connectable devices are connected to the image forming apparatus 200, the image forming apparatus 200 determines a device that performs a low-priority job as a device to be disconnected therefrom.

In operation S840, the image forming apparatus 200 disconnects the device determined to be disconnected therefrom.

In operation S850, if it is determined that a maximum number of connectable devices are not connected to the image forming apparatus 200, the image forming apparatus 200 establishes a connection to the external device. If it is determined that a maximum number of connectable devices are connected to the image forming apparatus 200, the image forming apparatus 200 disconnects the device determined to be disconnected therefrom in operation S840 and then, establishes a connection to the external device.

Figure 9:
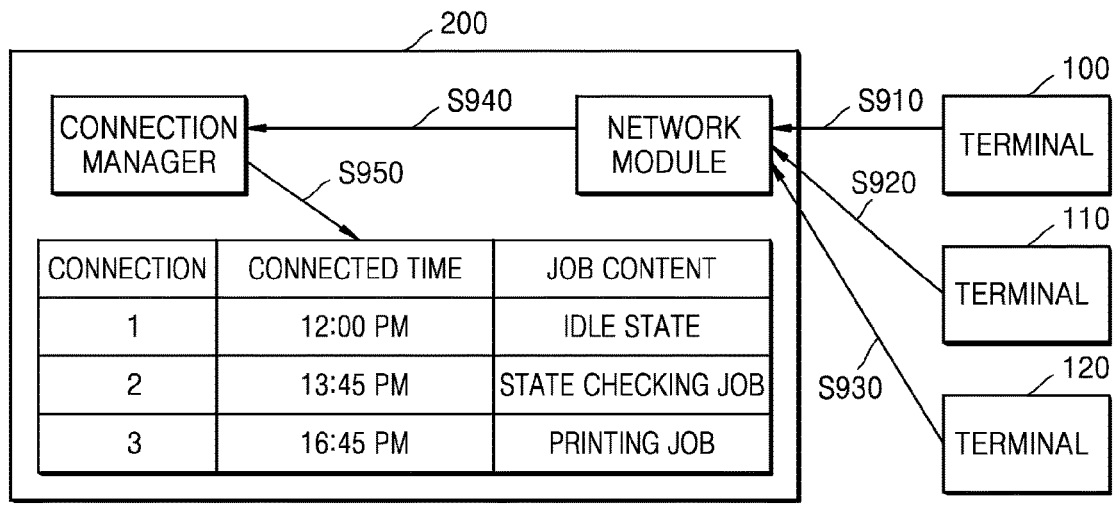
FIG. 9 is a diagram for explaining a process of storing connection state information of a device connected to an image forming apparatus, according to an embodiment.

FIG. 9 is a diagram for explaining a process of storing connection state information of a device connected to an image forming apparatus 200, according to an embodiment.

Referring to FIG. 9, in operations S910 to S930, a network module of the image forming apparatus 200 receives a Wi-Fi Direct (WFD) connection request from the devices 110 and 110 and 120. In operation S940, the network module transmits content about the received connection request to a connection manager.

The connection manager may manage connection state information in the form of a table regarding a time when the image forming apparatus 200 is connected to a device and what jobs are performed by the device via connection to the image forming apparatus 200. Thus, the connection manager may receive content about a connection request from the network module and record connection time to a device as a portion of the connection state information. Also, the connection manager records contents of jobs performed by the devices 100, 110, and 120 via the image forming apparatus 200 as connection state information in a table, based on data transmitted by the devices 100, 110, and 120 together with a connection request. The data may include, for example, a printing job request, a scanning job request, a fax job request, a state check request, or a setting change request.

For example, in regard to connection to the device 100, 12:00 PM may be recorded as connection time to the device 100 and an idle state where no job is performed may be recorded as job content in the table; in regard to connection to the device 110, 13:45 PM may be recorded as connection time to the device 110 and a state checking job for checking a state of an image forming apparatus may be recorded as job content in the table; and in regard to connection to the device 120, 16:45 PM may be recorded as connection time to the device 120 and a printing job may be recorded as job content in the table.

Figure 10:
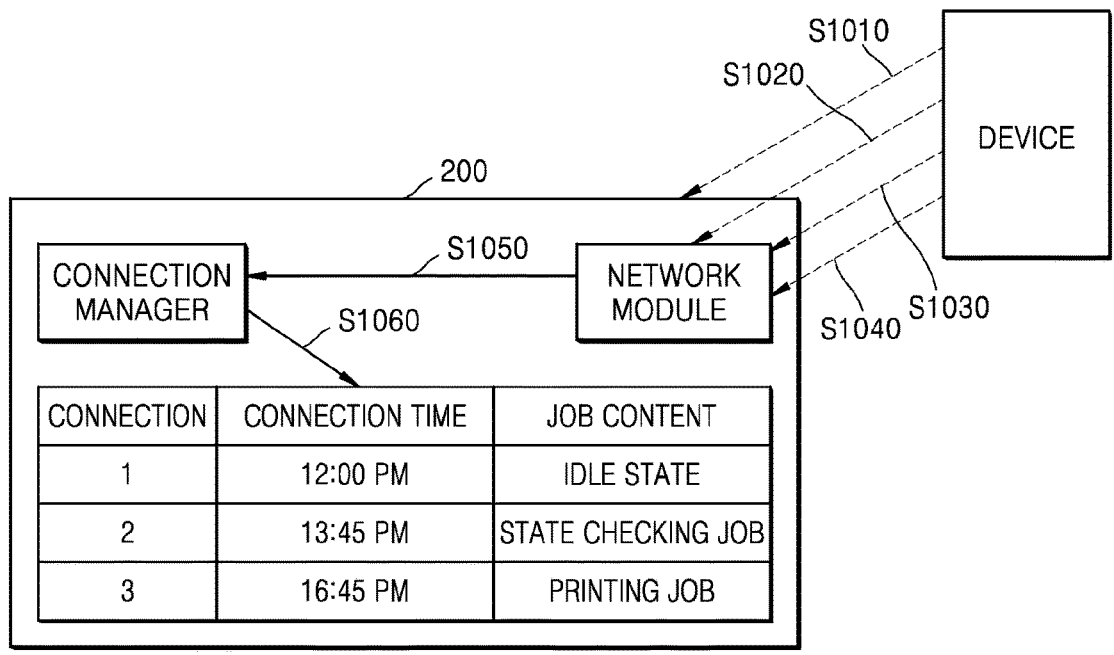
FIG. 10 is a diagram for explaining a process of updating connection state information of a device connected to an image forming apparatus, according to an embodiment.

FIG. 10 is a diagram for explaining a process of updating connection state information of a device connected to an image forming apparatus, according to an embodiment.

In operations S1010, S1020, S1030, and S1040, a device may transmit various types of job requests to perform a job via connection to the image forming apparatus. For example, in operation S1010, the device may transmit a request for checking a state of the image forming apparatus. In operation S1020, the device may transmit a printing job request. In operation S1030, the device may transmit a print setting change request. In operation S1040, the device may transmit a scanning job request. In operation S1050, the job requests as above are transmitted to the connection manager of the image forming apparatus. The connection manager updates connection state information based on the transmitted job requests. In detail, the connection manager updates contents of jobs performed via connection to the image forming apparatus based on the transmitted job requests.

Figure 11:
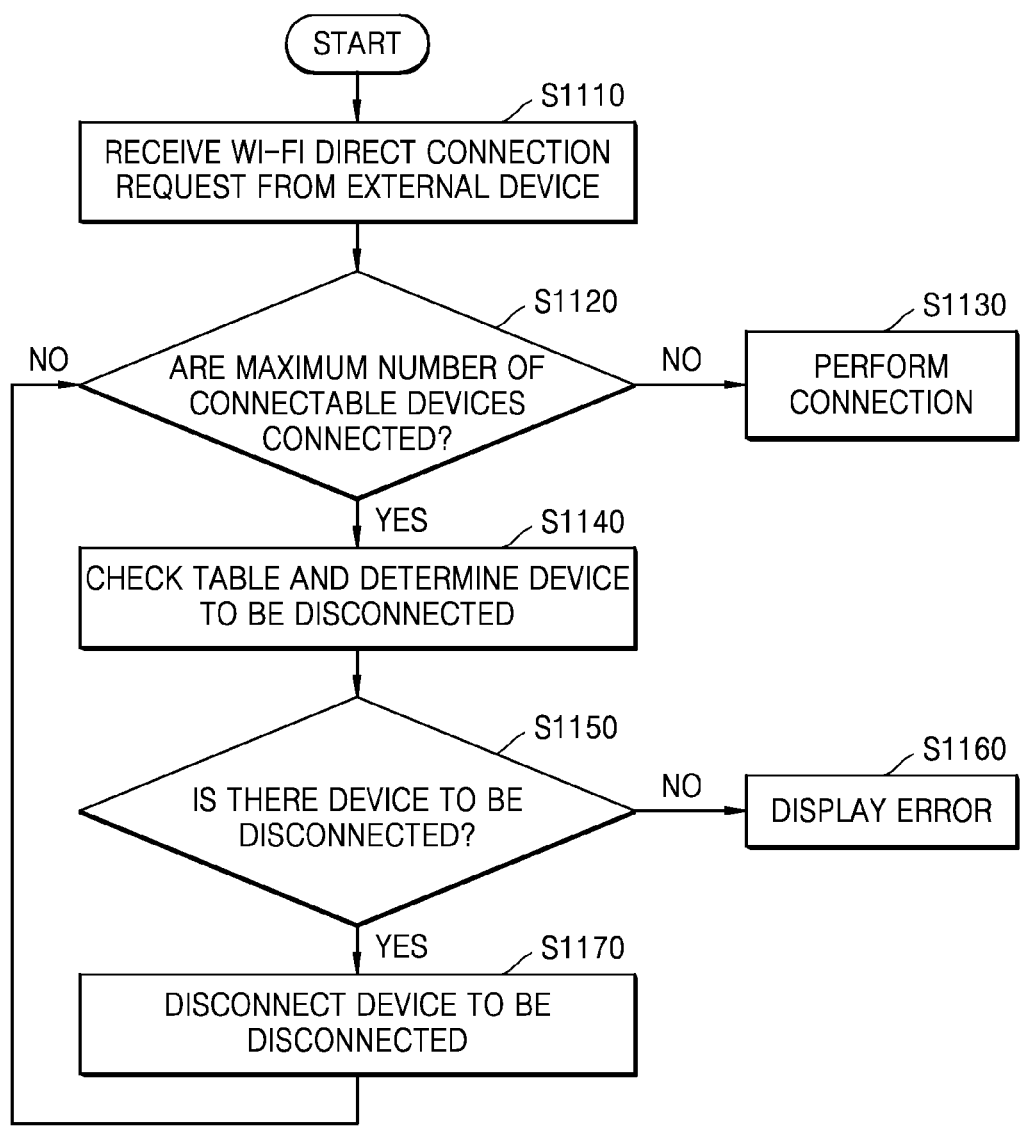
FIG. 11 is a diagram for explaining a process of disconnecting a connected device from an image forming apparatus based on connection state information, according to an embodiment.

FIG. 11 is a diagram for explaining a process of disconnecting a connected device from an image forming apparatus 200 based on connection state information, according to an embodiment.

In operation S1110, the image forming apparatus 200 receives a Wi-Fi Direct connection request from a device. The connection request may be generated by using near field communication (NFC), Bluetooth, or an infrared (IR) method.

In operation S1120, the image forming apparatus 200 determines whether a maximum connection limit has been reached. That is, the image forming apparatus 200 determines whether a maximum number of connectable devices are connected.

In operation S1130, if it is determined that the maximum connection limit has not been reached, the image forming apparatus 200 establishes a connection to the device.

In operation S1140, if it is determined that the maximum connection limit has been reached, the image forming apparatus 200 may check a table managed by a connection manager and determine a device to be disconnected from the image forming apparatus 200.

In operation S1150, it is determined whether there is or not a device to be disconnected from the image forming apparatus 200.

In operation S1160, if it is determined that there is no device to be disconnected from the image forming apparatus 200, the image forming apparatus 200 may display an error indicating that no device can be connected.

In operation S1170, if it is determined that there is a device to be disconnected from the image forming apparatus 200, the image forming apparatus 200 disconnects the device determined to be disconnected from the image forming apparatus 200.

FIG. 12 is a diagram for explaining a process of determining a device to disconnect from an image forming apparatus based on connection state information, according to an embodiment.

Figure 12A:
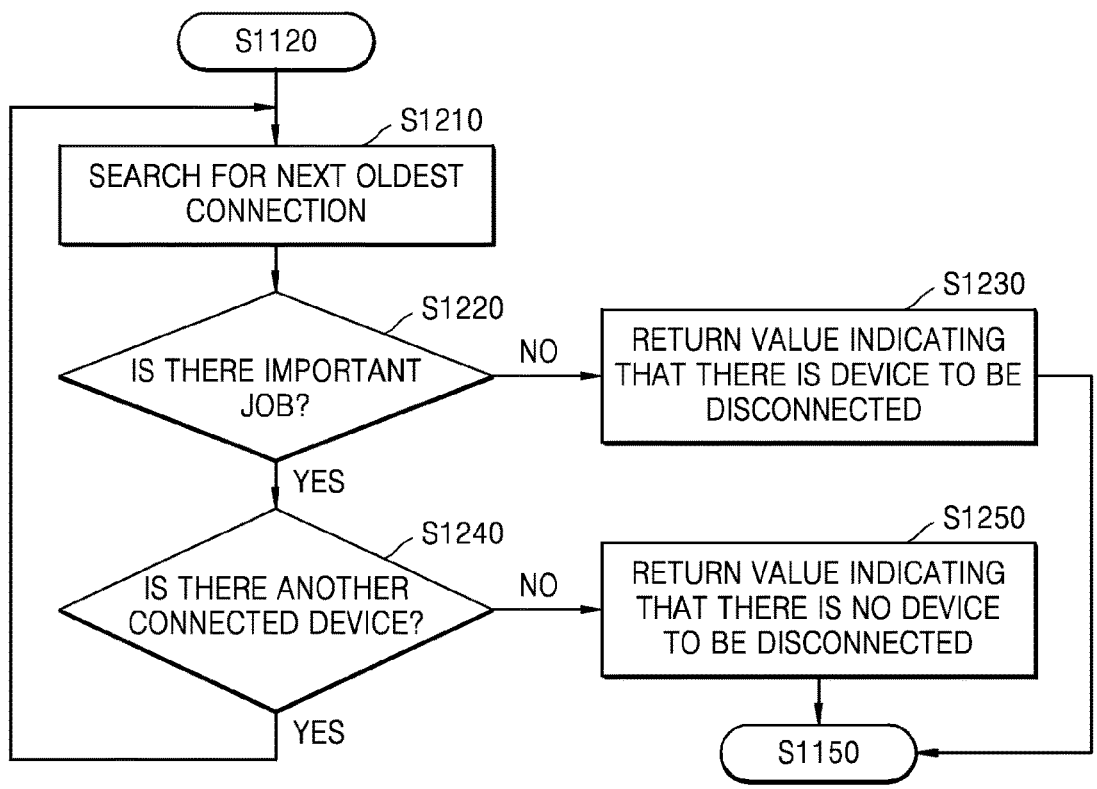

Referring to FIG. 12A, in operation 1210, the image forming apparatus 200 searches for an old connection. That is, the image forming apparatus 200 searches for an old connection by referring to connection time in the table managed by the connection manager.

In operation S1220, the image forming apparatus 200 determines whether an important job is being performed in the image forming apparatus 200 via the found connection. For example, the image forming apparatus 200 determines whether an important job is being performed by referring to a job category lookup table illustrated in FIG. 12B. The job category lookup table may be generated by a user or an administrator in advance. If job content in the table managed by the connection manager indicates an idle state, it may be determined that the job content is not an important job by referring to the job category lookup table. Alternatively, if job content in the table managed by the connection manager is a fax transmission job, the job content may be determined as an important job by referring to the category lookup table.

In operation S1230, if it is determined that no important job is being performed via the found connection, the image forming apparatus 200 returns a value indicating that there is a device to be disconnected from the image forming apparatus 200. In detail, the image forming apparatus 200 returns a value indicating that a corresponding connected device is a device to be disconnected from the image forming apparatus 200.

In operation S1240, if it is determined that an important job is being performed in the image forming apparatus via the corresponding connection, the image forming apparatus 200 determines whether there is another connected device. If there is another connected device, the method proceeds to operation S1210 to search for a connection that is next oldest.

In operation S1250, if it is determined that there is no other connected device, the image forming apparatus 200 returns a value indicating that there is no device to be disconnected from the image forming apparatus 200.

The image forming apparatus 200 determines in operation S1250 whether a device to be disconnected from the image forming apparatus 200 is present, based on the returned value.

Figure 13:
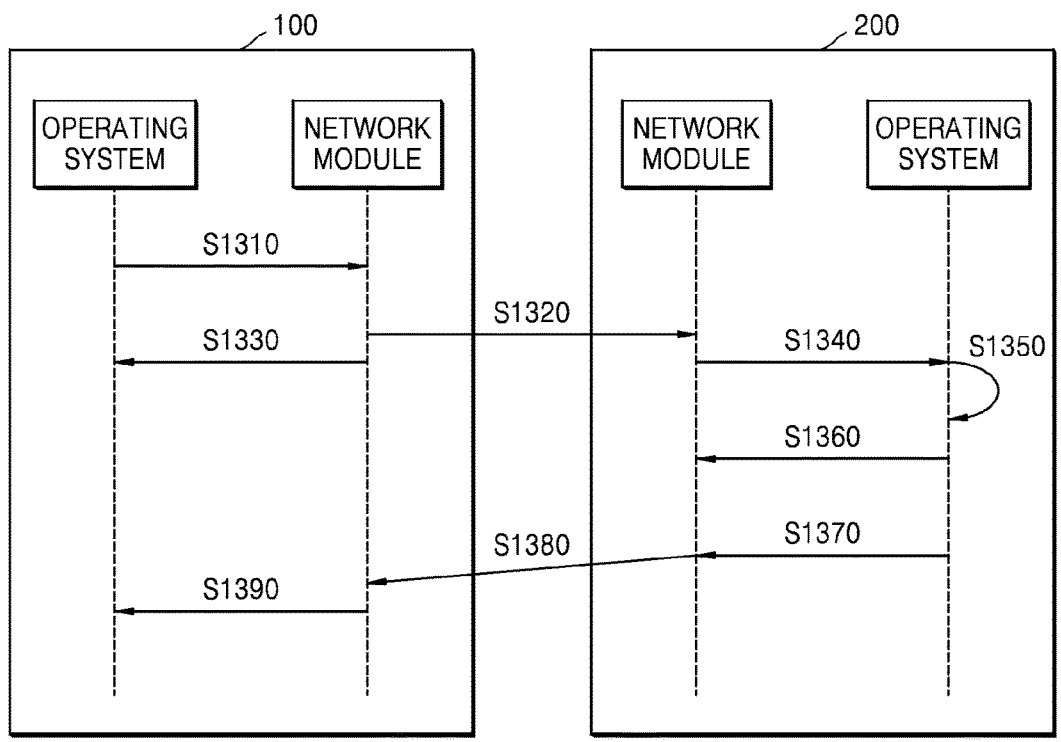
FIG. 13 is a diagram for explaining a detailed process of connecting an external device to an image forming apparatus via Wi-Fi Direct, based on connection state information, according to an embodiment.

FIG. 13 is a diagram for explaining a detailed process of connecting an external device to an image forming apparatus via Wi-Fi Direct, based on connection state information, according to an embodiment.

It is assumed that the image forming apparatus 200 operates as a group owner. When connecting devices via Wi-Fi Direct, first, a process of determining which device is to be a master or a slave is performed, and when one device is set to operate as a group owner, the one device is always determined as a master and acts like an access point (AP) on Wi-Fi and may approve or end connection between devices.

Referring to FIG. 13, in operation S1310, an invitation request is transmitted to a network module of an external device 100 in an operating system of an external device 100.

In operation S1320, the network module of the external device 100 transmits a P2P invitation request packet to a network module of the image forming apparatus 200.

In operation S1330, after transmitting the P2P invitation request packet, the network module of the external device 100 transmits to the operating system a message informing that transmission of the invitation request is completed.

In operation S1340, a network module of the image forming apparatus 200 transmits to an operating system of the image forming apparatus 200 a message informing that a WFD invitation request is received.

In operation S1350, the operating system of the image forming apparatus 200 searches for a connection that is best to disconnect from the image forming apparatus 200.

In operation S1360, the operating system of the image forming apparatus 200 transmits a disconnection request to the network module of the image forming apparatus 200 to disconnect a device that is best to disconnect.

In operation S1370, the operating system of the image forming apparatus 200 transmits a WFD connection response to the network module of the image forming apparatus 200.

In operation S1380, the network module of the image forming apparatus 200 transmits a P2P invitation response packet to the network module of the external device 100.

In operation S1390, the network module of the external device 100 transmits to the operating system of the external device 100 a message indicating that the WFD invitation response packet is received.

When the operating system of the external device 100 receives the message, a connection is established between the external device 100 and the image forming apparatus 200, and data can be transmitted or received via Wi-Fi Direct.

When a mobile device is Wi-Fi Direct connected to a device, a connection setting has to be performed manually for every Wi-Fi Direct connection or a setting configuration has to be done via NFC tagging.

In order to solve this problem, a method of automatically performing a Wi-Fi Direct connection to a device that has once been Wi-Fi Direct connected and a device for performing the method according to an embodiment are provided. Hereinafter, the present embodiment will be described in detail with reference to FIGS. 14 to 32.

Figure 14:
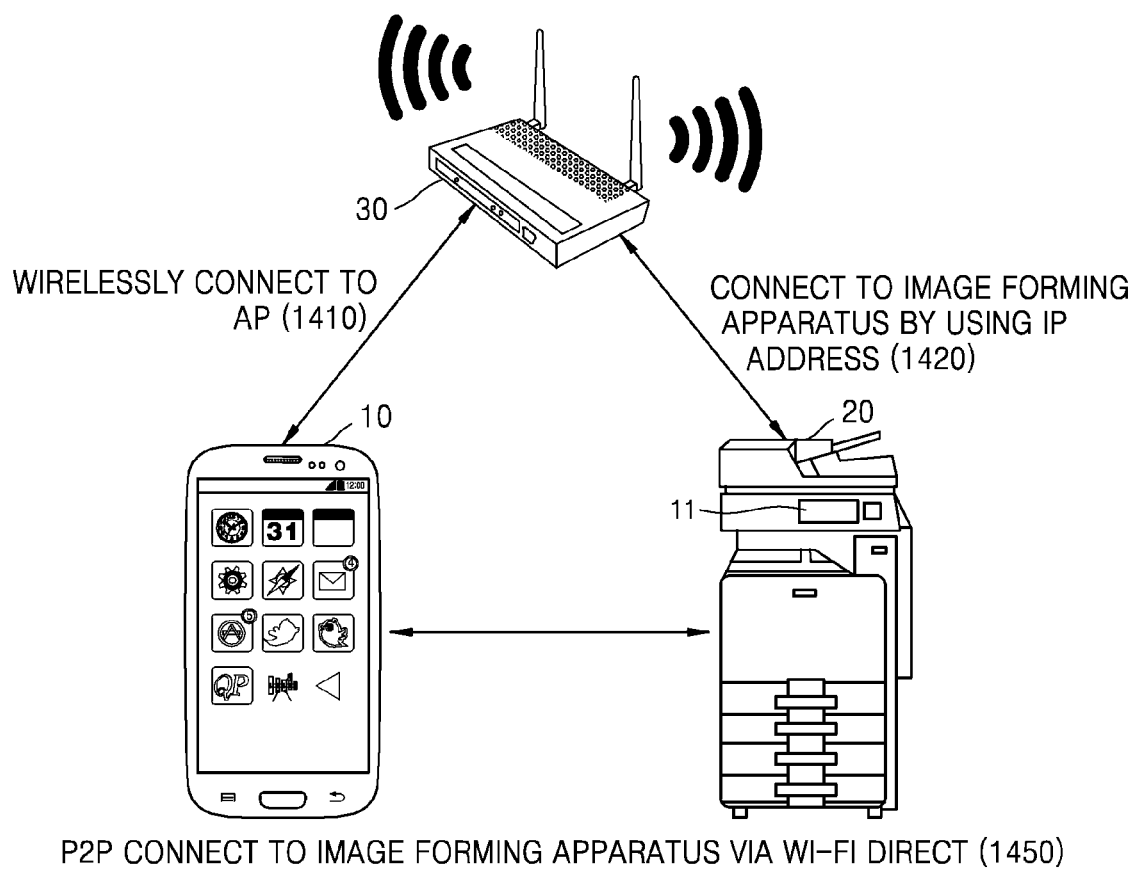
FIG. 14 is a diagram for explaining an environment in which a mobile device connects to an image forming apparatus to transmit or receive data, according to an embodiment.

FIG. 14 is a diagram for explaining an environment in which a mobile device connects to an image forming apparatus to transmit or receive data, according to an embodiment.

According to the present embodiment, it is assumed that a mobile device 10 try to connect to an image forming apparatus 20 to transmit printing data to the image forming apparatus 20.

Referring to FIG. 14, to connect the mobile device 10 with the image forming apparatus 20, for example, the mobile device 10 first connects to an AP (Access Point) 30 so as to be connected to the image forming apparatus 20.

In detail, in operation 1410, the mobile device 10 wirelessly connects to the AP 30. Here, Wi-Fi connection may be performed. When wireless connection to the AP 30 is performed, the mobile device 10 associates with a network configured by the AP 30. It is assumed that the image forming apparatus 20 has already performed wireless connection to the AP 30 and associated with the network configured by the AP 30.

In operation 1420, the mobile device 10 may connect to the image forming apparatus 20 by using an IP address of the image forming apparatus 20. The IP address of the image forming apparatus 20 may be immediately input to the mobile device 10 by a user or the user may obtain the IP address by tagging the mobile device 10 on an NFC tag 11 attached to the image forming apparatus 20.

When the mobile device 10 is connected to the image forming apparatus 20 by using the IP address, the mobile device 10 may transmit or receive data to or from the image forming apparatus 20. For example, the mobile device 10 may transmit printing data to the image forming apparatus 20. Data is not directly transmitted or received between the mobile device 10 and the image forming apparatus 20 but to and from each device through the AP 30.

As another method of connecting the mobile device 10 to the image forming apparatus 20, referring to FIG. 14, the mobile device 10 may be directly peer to peer (P2P)-connected to the image forming apparatus 20. As a P2P connection method, a Wi-Fi Direct connection may be performed between the mobile device 10 and the image forming apparatus 20. In operation 1450, the mobile device 10 performs P2P connection to the image forming apparatus 20 via Wi-Fi Direct. Here, the mobile device 10 may immediately transmit a connection request to the image forming apparatus 20 without accessing the AP 30 to perform a connection to the image forming apparatus 20. When sending a connection request, the mobile device 10 uses a Wi-Fi Direct MAC address of the image forming apparatus 20. The Wi-Fi Direct MAC address of the image forming apparatus 20 is a unique physical address of the image forming apparatus 20 only, and the user may immediately input the same to the mobile device 10, or the user may obtain the Wi-Fi Direct MAC address of the image forming apparatus 20 by tagging the mobile device 10 on the NFC tag 11 attached to the image forming apparatus 20.

When P2P connection to the image forming apparatus 20 is performed, data may be directly transmitted or received between the mobile device 10 and the image forming apparatus 20. That is, data may be directly transmitted or received between the mobile device 10 and the image forming apparatus 20 without passing the AP 30.

When the mobile device 10 performs P2P connection to the image forming apparatus 20, the Wi-Fi Direct Mac address, which is information needed for every P2P connection, has to be directly input to the mobile device 10 by the user, or the user has to tag the mobile device 10 on the NFC tag 11.

When the mobile device 10 according to the present embodiment is Wi-Fi Direct connected to the image forming apparatus 20, the mobile device 10 automatically stores connection information, and when the mobile device 10 is Wi-Fi Direct connected to the image forming apparatus 20 next time, the mobile device 10 may use the stored connection information so as to automatically connect to the image forming apparatus 20 without having to directly input a Wi-Fi Direct MAC address or to tag the mobile device 10 on the NFC tag 11.

While the operation of performing a Wi-Fi Direct connection to the image forming apparatus 20 by using the mobile device 10 has been described with reference to FIG. 14, the present embodiment is not limited thereto, and the above description of the mobile device 10 and the image forming apparatus 20 may also apply to devices supporting Wi-Fi Direct, such as a laptop computer, a desktop computer, a personal digital assistant (PDA), or a smartphone.

Figure 15:
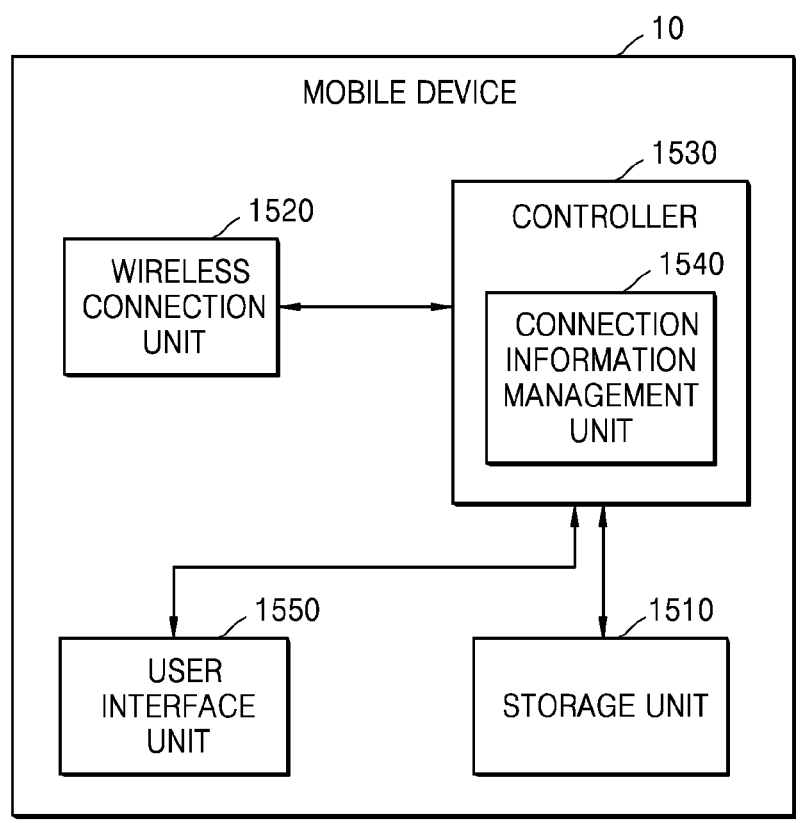
FIG. 15 is a block diagram illustrating a configuration of a mobile device according to an embodiment.

FIG. 15 is a block diagram illustrating a configuration of a mobile device according to an embodiment.

When the mobile device 10 connects again via Wi-Fi Direct to a device, which has Wi-Fi Direct connected to the mobile device 10 before, the mobile device 10 according to the present embodiment may perform a Wi-Fi Direct connection to a device based on connection information that is automatically stored when the mobile device 10 is Wi-Fi Direct-connected, without a user having to input connection information or to tag the mobile device 10 on a tag. Thus, the user does not have to input a Wi-Fi Direct MAC address and a Wi-Fi Direct personal identification number (PIN) every time when performing a Wi-Fi Direct connection, and thus, user convenience is improved.

Referring to FIG. 15, the mobile device 10 includes a wireless connection unit 1520, a controller 1530, a connection information management unit 1540, a storage unit 1510, and a user interface unit 1550.

The storage unit 1510 stores connection information used to wirelessly connect the mobile device 10 to an external device.

The wireless connection unit 1520 may wirelessly connect the mobile device 10 to an external device. In particular, the wireless connection unit 1520 may perform Wi-Fi Direct connection to an external device.

The controller 1530 may control an operation of each element of the mobile device 10. In detail, the controller 1530 determines a first device to be Wi-Fi Direct connected. The controller 1530 determines whether the first device was connected before. The controller 1530 controls the wireless connection unit 1520 such that Wi-Fi Direct connection to the first device is performed based on connection information stored in the storage unit 1510. The connection information may include at least one of a Wi-Fi Direct MAC address and a Wi-Fi Direct PIN of the first device. Also, the connection information may be obtained from an NFC tag or input by the user.

The controller 1530 may include the connection information management unit 1540. The connection information management unit 1540 manages connection information used when the mobile device 10 connects to an external device. In detail, the connection information management unit 1540 may automatically store connection information in the storage unit 1510 when the mobile device 10 is Wi-Fi Direct connected to the first device.

The controller 1530 may determine a second device if Wi-Fi Direct connection to the first device is not possible and may control the wireless connection unit 1520 such that Wi-Fi Direct connection to the second device is performed based on Wi-Fi Direct connection information about the second device.

When the connection information management unit 1540 has Wi-Fi Direct connected to the second device once, the connection information management unit 1540 automatically stores connection information in the storage unit 1510.

The controller 1530 may determine a present position of the mobile device 10, determine a device adjacent to the determined present position of the mobile device 10, and determine the device adjacent to the present device as a first device with which Wi-Fi Direct connection is to be performed.

When Wi-Fi Direct connection to the device is performed, the connection information management unit 1540 may store position information of the device together with connection information.

The controller 1530 may determine a device adjacent to the determined present position based on position information of the device.

When a predetermined application is executed, the controller 1530 determines a device that is connected via Wi-Fi Direct during previous execution of the predetermined application, as a first device, with which Wi-Fi Direct connection is to be performed. When the mobile device 10 is Wi-Fi Direct connected to a device during execution of the predetermined application, the connection information management unit 1540 may automatically store connection information about the device.

When the mobile device 10 is Wi-Fi Direct connected to a device during execution of the predetermined application, the connection information management unit 1540 may store information about an identifier of the device and a type of the performed connection together with connection information.

The controller 1530 may determine a first device based on information about an identifier of a device and a type of performed connection.

The controller 1530 and the connection information management unit 1540 may operate as a single processor. However, the exemplary embodiments are not limited thereto, and the controller 1530 and the connection information management unit 1540 may also operate in separate processors from each other.

While an application is being executed, the controller 1530 may control the user interface unit 1550 such that a user input that requests execution of an image forming job about contents related to the application is received.

The controller 1530 controls an application that is executed according to a received user input such that the application sends a search request for an image forming apparatus to a print framework.

When the print framework receives the search request from the application, the controller 1530 controls the print framework to transmit the search request to a plug-in. When the plug-in receives the search request from the print framework, the controller 1530 controls the plug-in to search for an image forming apparatus that is supported by the plug-in. That is, the controller 1530 controls the plug-in to search for an image forming apparatus that is registered to the plug-in.

The controller 1530 controls the plug-in such that the plug-in transmits a list including the found image forming apparatus to the application through print framework.

The controller 1530 may control the user interface unit 1550 such that the application displays the list including the found image forming apparatus.

The controller 1530 may control the user interface unit 1550 such that a user input for selecting at least one image forming apparatus from the list is received. When the user input for selecting at least one image forming apparatus is received from the list, the controller 1530 determines the selected image forming apparatus as a first device with which Wi-Fi Direct connection is to be performed.

The controller 1530 obtains capability and state information about the selected image forming apparatus from a plug-in related to the selected image forming apparatus.

The controller 1530 may control the user interface unit 1550 such that a user input for selecting a file from which an image forming job is to be performed is received.

When the user input for selecting a file, from which an image forming job is to be performed, is received, the controller 1530 may transmit a printing request about the selected file to the print framework.

When the print framework receives a printing request about the selected file, the controller 1530 may convert the selected file and control the print framework such that the printing request about the converted file is transmitted to the plug-in related to the selected image forming apparatus so that the image forming apparatus may perform an image forming job.

The controller 1530 may control the wireless connection unit 1520 such that wireless connection unit 1520 transmits a group owner negotiation request to the first device. The controller 1530 may control to transmit the group owner negotiation request to the first device to determine a group owner from among the mobile device 10 and the first device.

The controller 1530 may control the wireless connection unit 1520 such that Wi-Fi Direct connection to the first device is performed according to the above determination. In detail, the controller 1530 may control the wireless connection unit 1520 such that the determined group owner among the mobile device 10 and the first device makes a request, and one of the mobile device 10 and the first device transmits a connection request to the other based on the determination, and Wi-Fi Direct connection is performed between the first device and the mobile device 10 in response to the connection request.

The user interface unit 1550 may display a list including a plurality of devices and may receive a user input for selecting a first device with which Wi-Fi Direct connection is to be performed among a plurality of devices included in the list.

Figure 16:
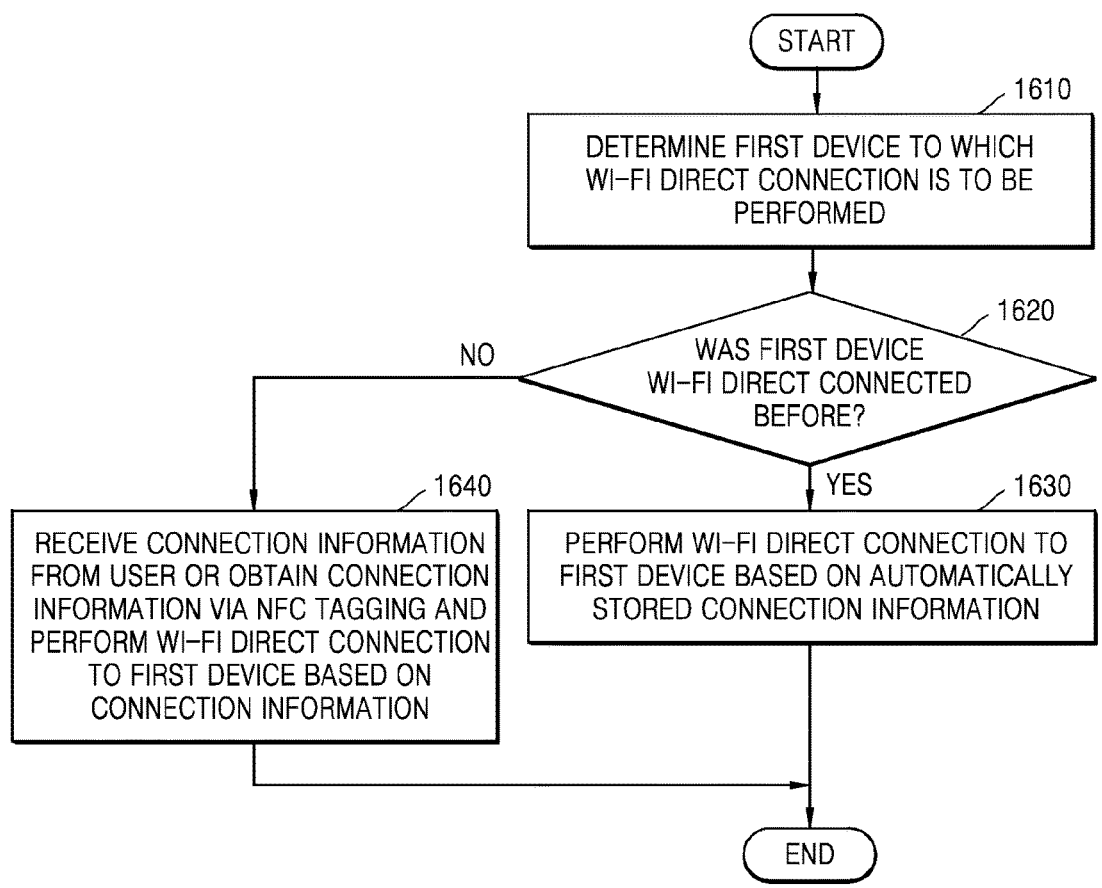
FIG. 16 is a flowchart of performing a Wi-Fi Direct connection to a first device, by using a mobile device, according to an embodiment.

FIG. 16 is a flowchart of performing a Wi-Fi Direct connection to a first device by using a mobile device, according to an embodiment.

Referring to FIG. 16, in operation 1610, the image forming apparatus 20 may determine a first device to which Wi-Fi Direct connection is to be performed. For example, the mobile device 10 may search for a connectable device around the mobile device 10 and receive an input for selecting one of the found connectable devices from the user.

In operation 1620, the mobile device 10 determines whether the mobile device 10 was Wi-Fi Direct connected to the first device before.

In operation 1630, if it is determined that the mobile device 10 was Wi-Fi Direct connected to the first device before, Wi-Fi Direct connection to the first device may be performed based on automatically stored connection information. That is, when Wi-Fi Direct connection has been performed, the mobile device 10 may include connection information that is automatically stored when the mobile device 10 is Wi-Fi Direct connected to the first device, and thus the mobile device 10 may perform Wi-Fi Direct connection to the first device by using the automatically stored connection information. The connection information may include at least one of a Wi-Fi Direct MAC address and a Wi-Fi Direct PIN.

In operation 1640, if it is determined that the mobile device 10 was not Wi-Fi Direct connected to the first device before, the mobile device 10 may receive connection information from a user or may obtain connection information by tagging on an NFC tag. As the mobile device 10 was not Wi-Fi Direct connected to the first device before, the mobile device 10 does not have connection information about the first device. Thus, the mobile device 10 needs to obtain connection information. For example, the mobile device 10 may receive connection information from the user or by tagging on an NFC tag. However, exemplary embodiments are not limited thereto, and the mobile device 10 may obtain connection information in various forms.

Figure 17:
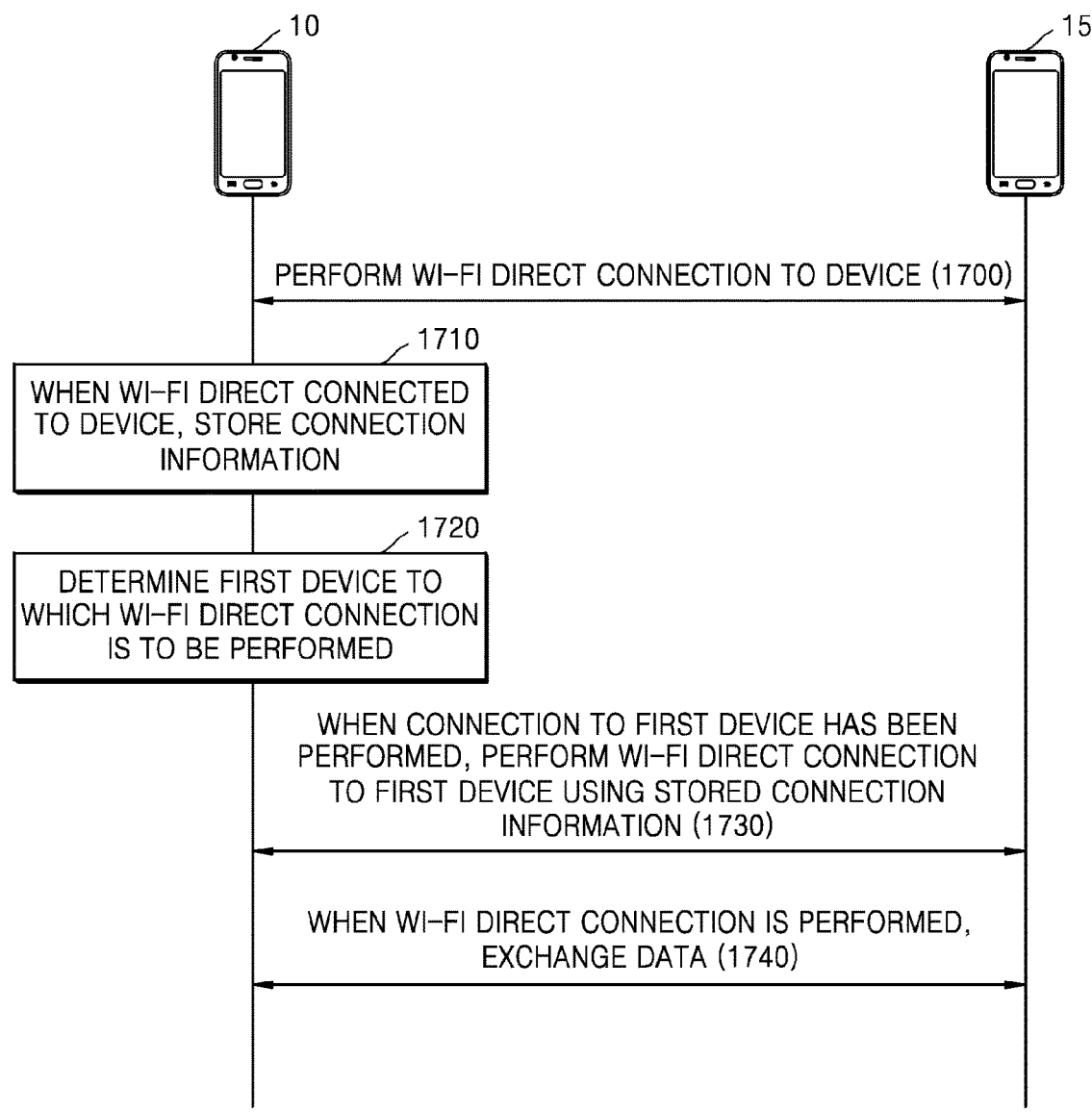
FIG. 17 illustrates a method of performing a Wi-Fi Direct connection between a mobile device and a device, according to an embodiment.

FIG. 17 illustrates a method of performing a Wi-Fi Direct connection between a mobile device 10 and a device 15, according to an embodiment.

In operation 1700, the mobile device 10 performs a Wi-Fi Direct connection to the device 15. That is, when the mobile device 10 sends a connection request to the device 15, the mobile device 10 may receive a response to the connection request from the device 15 to perform Wi-Fi Direct connection to the device 15. The device 15 may be a mobile device but is not limited thereto and may be various devices such as an image forming apparatus, a laptop computer, a PDA, or a PC.

In operation 1710, when the mobile device 10 is Wi-Fi Direct connected to the device 15, the mobile device 10 may store connection information. That is, when the mobile device 10 is Wi-Fi Direct connected to the device 15, the mobile device 10 may automatically store connection information about the device 15. Next, the mobile device 10 may exchange data with the device 15. After exchanging desired data, Wi-Fi Direct connection to the device 15 may be disconnected.

In operation 1720, the mobile device 10 may determine a first device to which Wi-Fi Direct connection is to be performed. For example, the mobile device 10 may determine the device 15 as the first device with which Wi-Fi Direct connection is to be performed, from among a plurality of devices.

In operation 1730, the mobile device 10 determines whether the mobile device 10 was connected to the first device before, and if the mobile device 10 was connected to the first device before, the mobile device 10 may perform a Wi-Fi Direct connection to the first device by using the stored connection information.

According to the present embodiment, if the first device to which Wi-Fi Direct connection is to be performed is the device 15, the mobile device 10 may determine that the mobile device 10 was connected to the first device before and perform Wi-Fi Direct connection to the first device by using the stored connection information.

In operation 1740, when Wi-Fi Direct connection to the first device is performed, the mobile device 10 may exchange data with the first device via Wi-Fi Direct connection.

Figure 18:
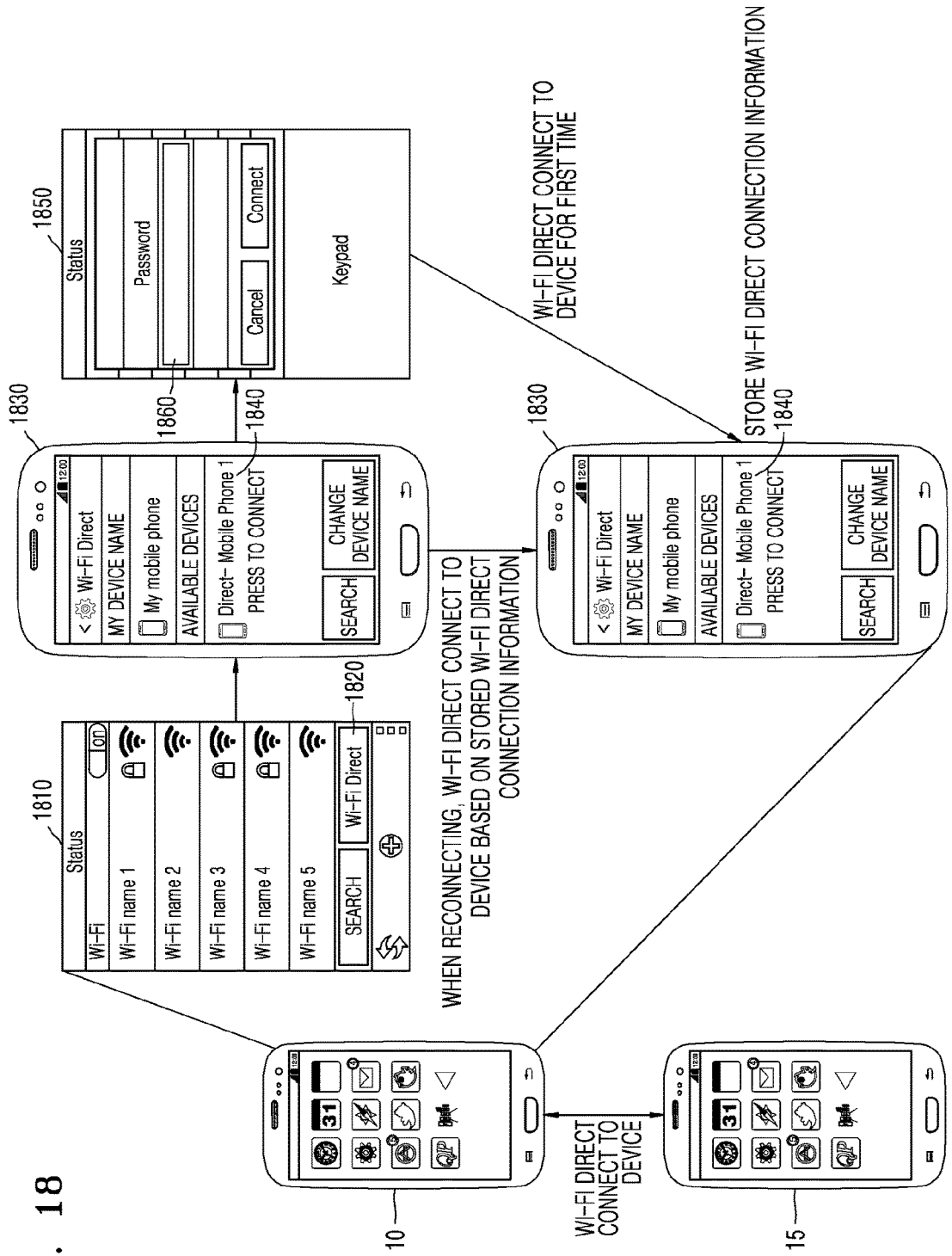
FIG. 18 is a diagram for explaining a process of connecting a mobile device to a first device via Wi-Fi Direct by a user using a mobile device, according to an embodiment.

FIG. 18 is a diagram for explaining a process of establishing a Wi-Fi Direct connection between a mobile device 10 and a device 15 by a user using the mobile device 10, according to an embodiment.

According to the present embodiment, it is assumed that a user wishes to perform Wi-Fi Direct connection to another mobile device by using the mobile device 10. It is assumed that the above other device, to which the user wishes to perform Wi-Fi Direct connection by using the mobile device 10, has not been connected to the mobile device 10 via Wi-Fi Direct connection before.

The user selects Wi-Fi Direct 1820 on a Wi-Fi screen 1810.

Then, the mobile device 10 displays a Wi-Fi Direct screen 1830. The user selects a mobile device to be Wi-Fi Direct connected to, by using the mobile device 10. The mobile device 10 searches for a Wi-Fi Direct connectable device around the mobile device 10 and displays a found device on the Wi-Fi Direct screen 1830. Currently, the found device, a Direct-Mobile Phone 1 1840, is displayed on the Wi-Fi Direct screen 1830. The user selects the Direct-Mobile Phone 1 1840 on the Wi-Fi Direct screen 1830. When the Direct-Mobile Phone 1 1840 is selected, a password screen 1850 is displayed, and the user may input a password to a password input field 1860 on the password screen 1850. Here, the password may be a Wi-Fi Direct PIN of the device 15.

When the user inputs a password to the password input field 1860, Wi-Fi Direct connection to the device 15 corresponding to the Direct-Mobile Phone 1 is performed. When the mobile device 10 performs a Wi-Fi Direct connection to the device 15, on the Wi-Fi Direct screen 1830, 'PRESS TO CONNECT' below 'Direct-Mobile Phone 1' is changed to 'CONNECTED.' The mobile device 10 may automatically store connection information used to perform Wi-Fi Direct connection to the device 15, in the mobile device 10. Connection information may include at least one of a Wi-Fi Direct MAC address and a Wi-Fi Direct PIN of the device 15. The user may exchange data via Wi-Fi Direct connection to the device 15 by using the mobile device 10.

Later, the user tries to reconnect to the device 15 that has been Wi-Fi Direct connected before, by using the mobile device 10.

The user selects Wi-Fi Direct 1820 on the Wi-Fi screen 1810. The mobile device 10 displays the Wi-Fi Direct screen 1830. The user selects a mobile device to be Wi-Fi Direct connected to. The mobile device 10 searches for a Wi-Fi Direct connectable device around the mobile device 10 and displays a found device on the Wi-Fi Direct screen 1830. Currently, the Direct-Mobile Phone 1 1840 that is found is displayed on the Wi-Fi Direct screen 1830. The user selects the Direct-Mobile Phone 1 1840 on the Wi-Fi Direct screen 1830. The mobile device 10 determines whether the mobile device 10 has been Wi-Fi Direct connected to the device 15 corresponding to the selected Direct-Mobile Phone 1' 1840 before. As the mobile device 10 has been Wi-Fi Direct connected to the device 15 before, the mobile device 10 performs a Wi-Fi Direct connection to the device 15 by using connection information stored when the mobile device 10 was connected to the device 15 via Wi-Fi Direct. That is, when the user performs a Wi-Fi Direct connection to the device 15 the first time by using the mobile device 10, the user has to input a password to the password input field 1860 on the password screen 1850, but after, there is no need to additionally input a password because the stored connection information includes the password.

The mobile device 10 performs Wi-Fi Direct connection based on the device 15 corresponding to 'Direct-Mobile Phone 1' 1840 and the stored connection information. When the mobile device 10 performs a Wi-Fi Direct connection to the device 15, 'PRESS TO CONNECT' below 'Direct-Mobile Phone 1' 1840 on the Wi-Fi Direct screen 1830 is changed to 'CONNECTED.' The user may exchange data with the device 15 by using the mobile device 10 via Wi-Fi Direct connection.

Figure 19:
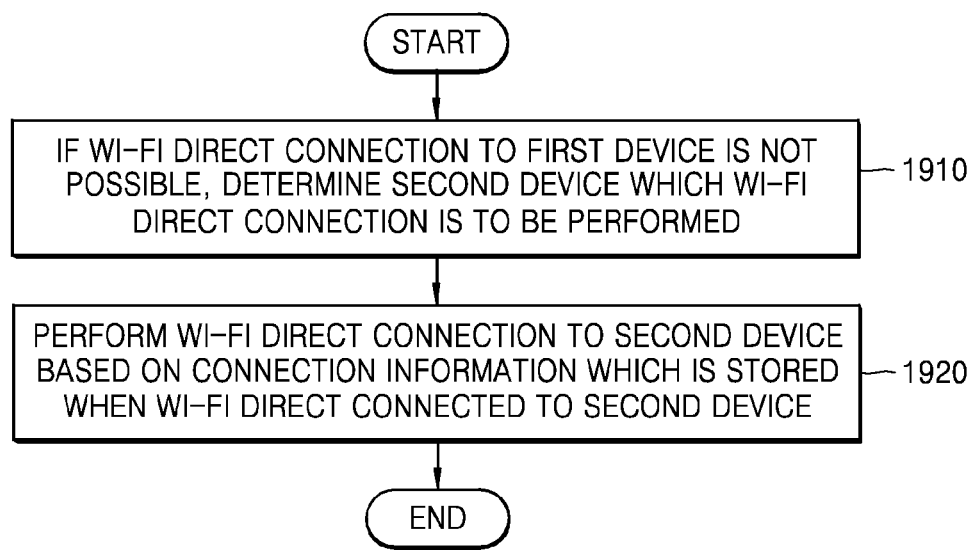
FIG. 19 is a flowchart of a method of performing a Wi-Fi Direct connection, which is operation 1630 of FIG. 16, according to an embodiment.

FIG. 19 is a flowchart of a method of performing a Wi-Fi Direct connection, which is operation 1630 of FIG. 16, according to an embodiment.

In operation 1910, when Wi-Fi Direct connection to the first device is not possible, the mobile device 10 may determine a second device. Wi-Fi Direct connection to the first device is not possible, for example, when the first device is not within coverage of the mobile device 10 or a PIN is changed. The second device may be a device that has been Wi-Fi Direct connected to the mobile device 10 before. The mobile device 10 may automatically store connection information when the mobile device 10 is Wi-Fi Direct-connected to the second device. Thus, the mobile device 10 may store connection information about the second device.

In operation 1920, the mobile device 10 may perform a Wi-Fi Direct connection to the second device based on connection information which is automatically stored when Wi-Fi Direct Connected to the second device.

Figure 20:
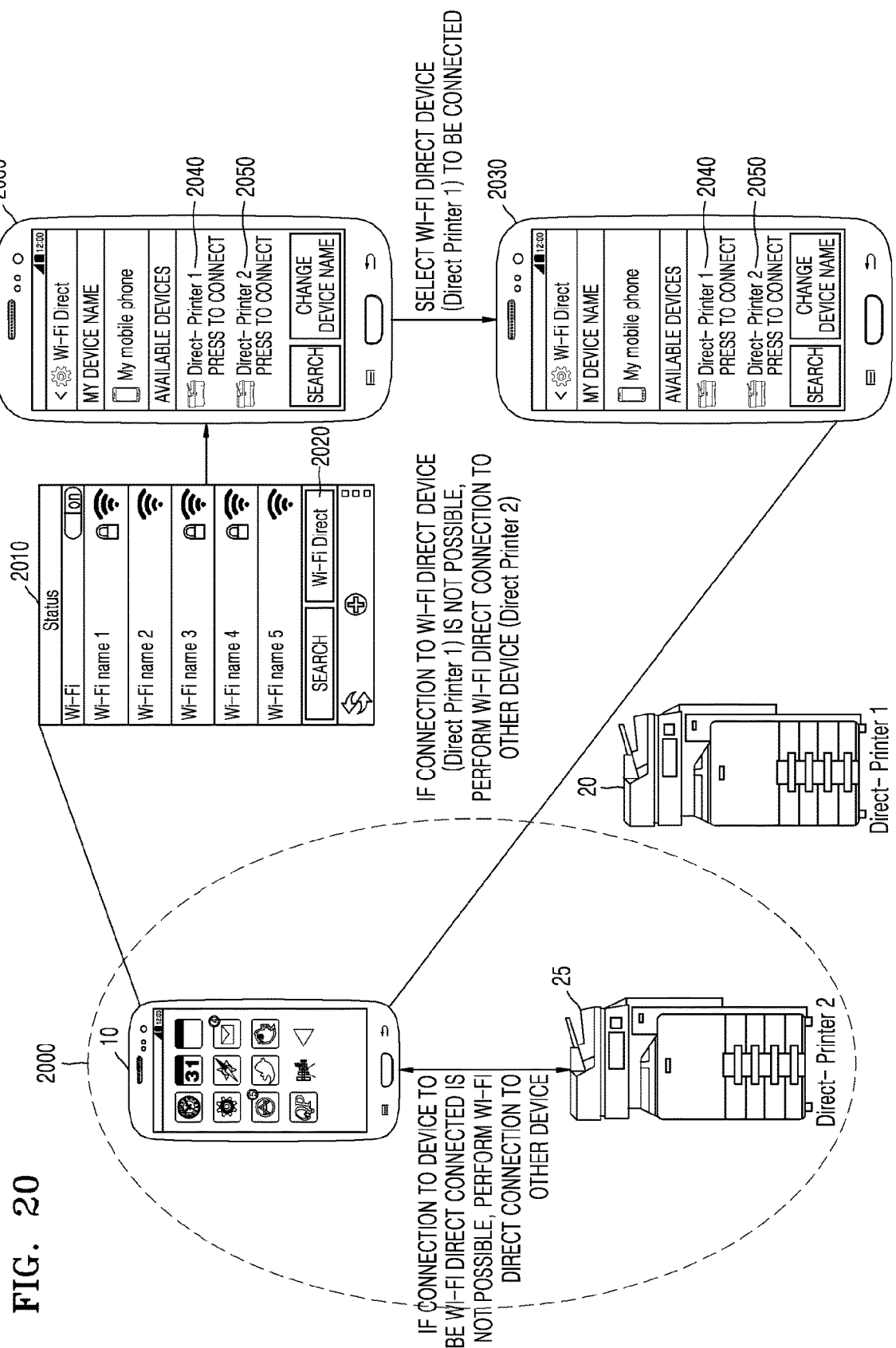
FIG. 20 is a diagram for explaining a process of connecting a mobile device to a second device via Wi-Fi Direct by a user using the mobile device, according to an embodiment.

FIG. 20 is a diagram for explaining a process of connecting a mobile device 10 to a device 25 via Wi-Fi Direct by a user using the mobile device 10, according to an embodiment.

According to the present embodiment, it is assumed that a user wishes to perform a Wi-Fi Direct connection to an image forming apparatus by using the mobile device 10. In addition, it is assumed that the user has performed a Wi-Fi Direct connection to image forming apparatuses 20 and 25 by using the mobile device 10.

The user selects Wi-Fi Direct 2020 on a Wi-Fi screen 2010.

The mobile device 10 displays a Wi-Fi Direct screen 2030. The user selects an image forming apparatus to be Wi-Fi Direct connected to by using the mobile device 10. The mobile device 10 searches around the mobile device 10 for a device to be Wi-Fi Direct connected to and displays found devices on the Wi-Fi Direct screen 2030. Currently, Direct-Printer 1 2040 and Direct-Printer 2 2050, which are found in the search, are displayed on the Wi-Fi Direct screen 2030. The user selects Direct-Printer 1 2040 on the Wi-Fi Direct screen 2030.

When the user selects Direct-Printer 1 2040, the mobile device 10 determines whether the mobile device 10 has been Wi-Fi Direct connected to the image forming apparatus 20 corresponding to Direct-Printer 1' before. As it is assumed that the mobile device 10 has been Wi-Fi Direct connected to the image forming apparatus 20, it is determined that the mobile device 10 has been Wi-Fi Direct connected to the image forming apparatus 20. The mobile device 10 attempts Wi-Fi Direct connection to the image forming apparatus 20 by using connection information that was automatically stored when the mobile device 10 was connected to the image forming apparatus 20 before. Here, it is assumed that the image forming apparatus 20 is outside the Wi-Fi Direct coverage 2000 of the mobile device 10. Thus, the mobile device 10 is not able to perform Wi-Fi Direct connection to the image forming apparatus 20.

When Wi-Fi Direct connection to the image forming apparatus 20 is not possible, the mobile device 10 determines another device as a second device. The mobile device 10 may determine a device that has been Wi-Fi Direct connected before, as the second device. In the present embodiment, the mobile device 10 may determine the image forming apparatus 25, which has been Wi-Fi Direct connected, as the second device. The mobile device 10 may perform a Wi-Fi Direct connection to the image forming apparatus 25 by using the connection information that was automatically stored when the mobile device 10 was Wi-Fi Direct connected to the image forming apparatus 25 before. When the mobile device 10 is Wi-Fi Direct connected to the image forming apparatus 25, 'PRESS TO CONNECT' below 'Direct-Mobile Phone 2' 2050 corresponding to the image forming apparatus 25 on the Wi-Fi Direct screen 2030 is changed to 'CONNECTED.'

The user may exchange data with the image forming apparatus 25 via Wi-Fi Direct connection by using the mobile device 10.

Figure 21:
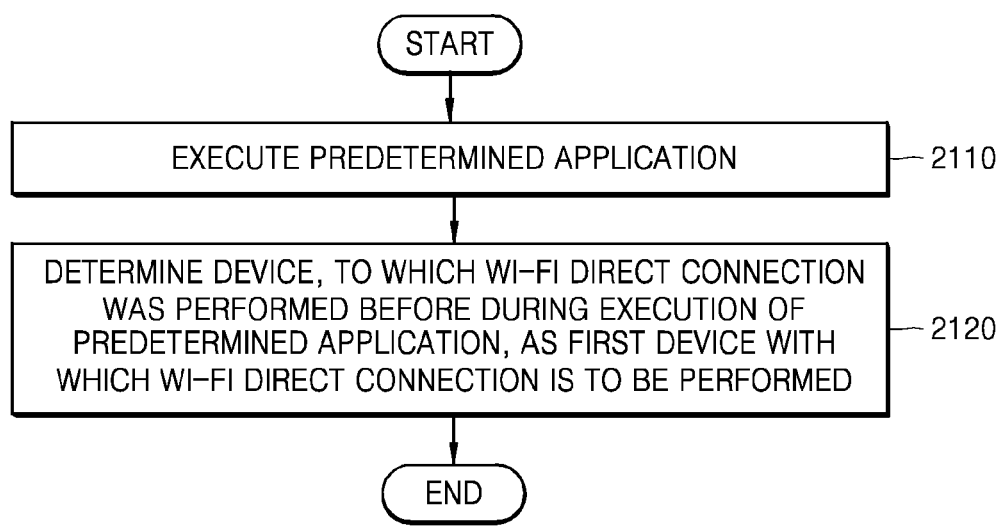
FIG. 21 is a detailed flowchart of operation 1610 of FIG. 16 according to an embodiment.

FIG. 21 is a detailed flowchart of operation 1610 of FIG. 16 according to an embodiment.

In operation 2110, the mobile device 10 may execute (operate) a predetermined application. For example, the user may execute a printing application to print content by using the mobile device 10.

In operation 2120, the mobile device 10 may determine a device, to which Wi-Fi Direct connection was performed before during execution of a predetermined application, as a first device with which Wi-Fi Direct connection is to be performed. During previous execution of a predetermined application, the mobile device 10 may store information about a device identifier of a device to which Wi-Fi Direct connection is performed and a type of performed connection. For example, during execution of a printing application, the mobile device 10 may store a model name of an image forming apparatus to which Wi-Fi Direct connection is performed, as a device identifier, and may differently store information about a connection type according to whether the performed connection is Wi-Fi Direct connection or Wi-Fi connection.

The mobile device 10 may determine a device as the first device by using the stored information about an identifier of a device, to which Wi-Fi Direct connection is performed, and a type of performed connection.

Figure 22:
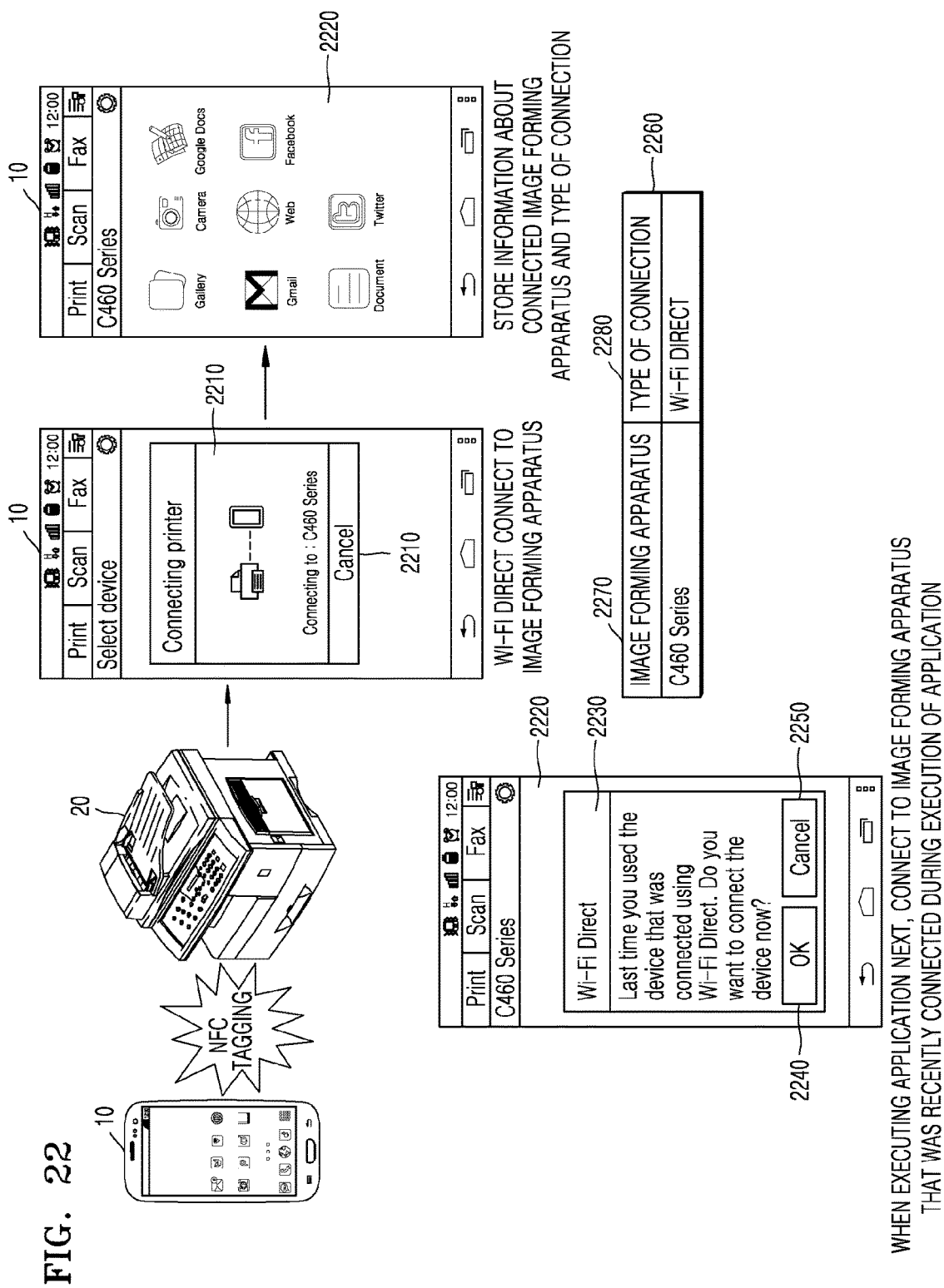
FIG. 22 is a diagram for explaining a process of performing a Wi-Fi Direct connection to an image forming apparatus, which was Wi-Fi Direct connected before on a printing application executed on a mobile device, by a user, according to an embodiment.

FIG. 22 is a diagram for explaining a process of performing a Wi-Fi Direct connection to an image forming apparatus, which was Wi-Fi Direct connected before on a printing application executed on a mobile device, by a user, according to an embodiment.

According to the present embodiment, the mobile device 10 may Wi-Fi Direct connect to the image forming apparatus 20 and store connection information of the connected image forming apparatus 20. When executing a next application, the mobile device 10 may perform a Wi-Fi Direct connection to the image forming apparatus 20 that was connected to the mobile device 10 during a recent execution of an application, by using the connection information.

Referring to FIG. 22, the user tags the mobile device 10 on an NFC tag attached to the image forming apparatus 20. The NFC tag stores connection information for performing a Wi-Fi Direct connection. Also, the NFC tag may store printing application execution information so that the image forming apparatus 20 executes a printing application.

The mobile device 10 performs a Wi-Fi Direct connection to the image forming apparatus 20 by using connection information obtained by tagging on the NFC tag. Here, a message 2210 informing that the mobile device 10 is being connected to the image forming apparatus 20 may be displayed on a screen of the mobile device 10. In particular, the mobile device 10 may execute a printing application 2220 by using the printing application execution information that is obtained by tagging on the NFC tag.

When a Wi-Fi Direct connection to the image forming apparatus 20 is performed, the mobile device 10 may store information about the connected image forming apparatus 20 and a type of connection. In particular, the mobile device 10 may store image forming apparatuses and connection types in the form of a table 2260. For example, when a model name of a connected image forming apparatus is 'C450 Series' and a connection type is Wi-Fi Direct, an image forming apparatus field 2270 may be stored as 'C450 Series' and a connection type field 2280 may be stored as 'Wi-Fi Direct' in the table 2260.

The user may print various contents by using the printing application 2220 executed on the mobile device 10 via the image forming apparatus 20.

Then, the user executes the printing application 2220 by using the mobile device 10 to print content via the image forming apparatus 20. The mobile device 10 may automatically connect to the image forming apparatus 20 that the mobile device 10 connected to last during execution of the printing application 2220. Here, a message 2230 indicating that the image forming apparatus 20 has been Wi-Fi Direct connected to the mobile device 10 is displayed on the screen of the mobile device 10, and the user may select one of an OK button 2240 and a cancel button 2250 to determine whether to connect the mobile device 10 with the image forming apparatus 20 via Wi-Fi Direct.

Figure 23:
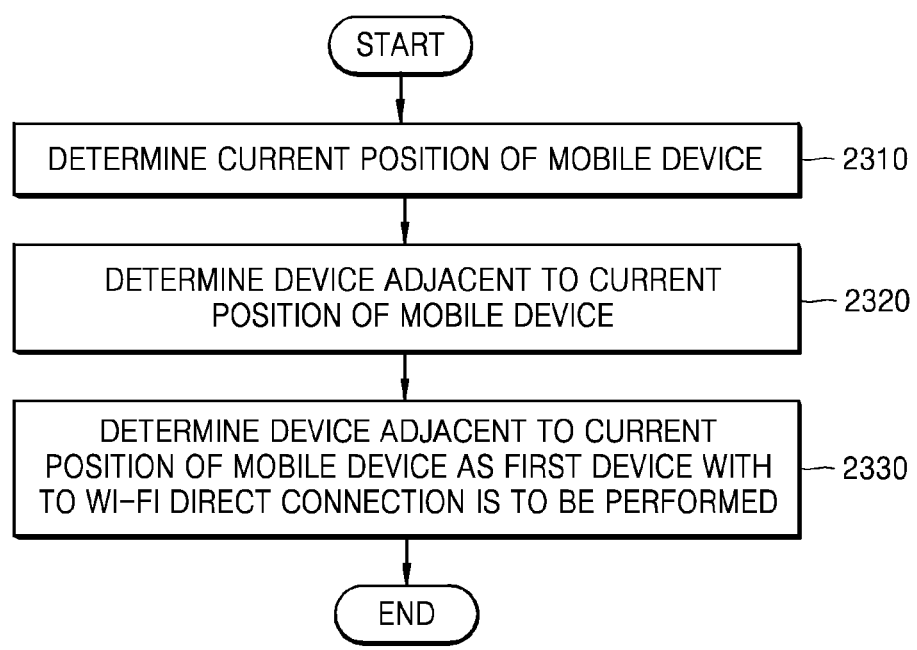
FIG. 23 is a detailed flowchart of operation 1610 of FIG. 16, according to an embodiment.

FIG. 23 is a detailed flowchart of operation 1610 of FIG. 16, according to an embodiment.

In operation 2310, the mobile device 10 determines a current position of the mobile device 10. For example, the user may determine a current position of the mobile device 10 by using information received by a GPS sensor, a Wi-Fi module, or a cellular network module of the mobile device 10.

In operation 2320, the mobile device 10 determines a device adjacent to the current position thereof.

Here, the mobile device 10 may store position information thereof and may determine a device that is adjacent to the current position of the mobile device 10 by using the stored position information thereof.

When the mobile device 10 is Wi-Fi Direct connected to the device, the mobile device 10 may automatically store position information of the device together with Wi-Fi Direct information. The mobile device 10 may receive from the device position information stored therein, and as the mobile device 10 is adjacent to the device, the mobile device 10 may store position information thereof as position information of the connected device.

In operation 2330, the mobile device 10 may determine a device adjacent to a current position of the mobile device 10 as the first device with which Wi-Fi Direct connection is to be performed.

Figure 24:
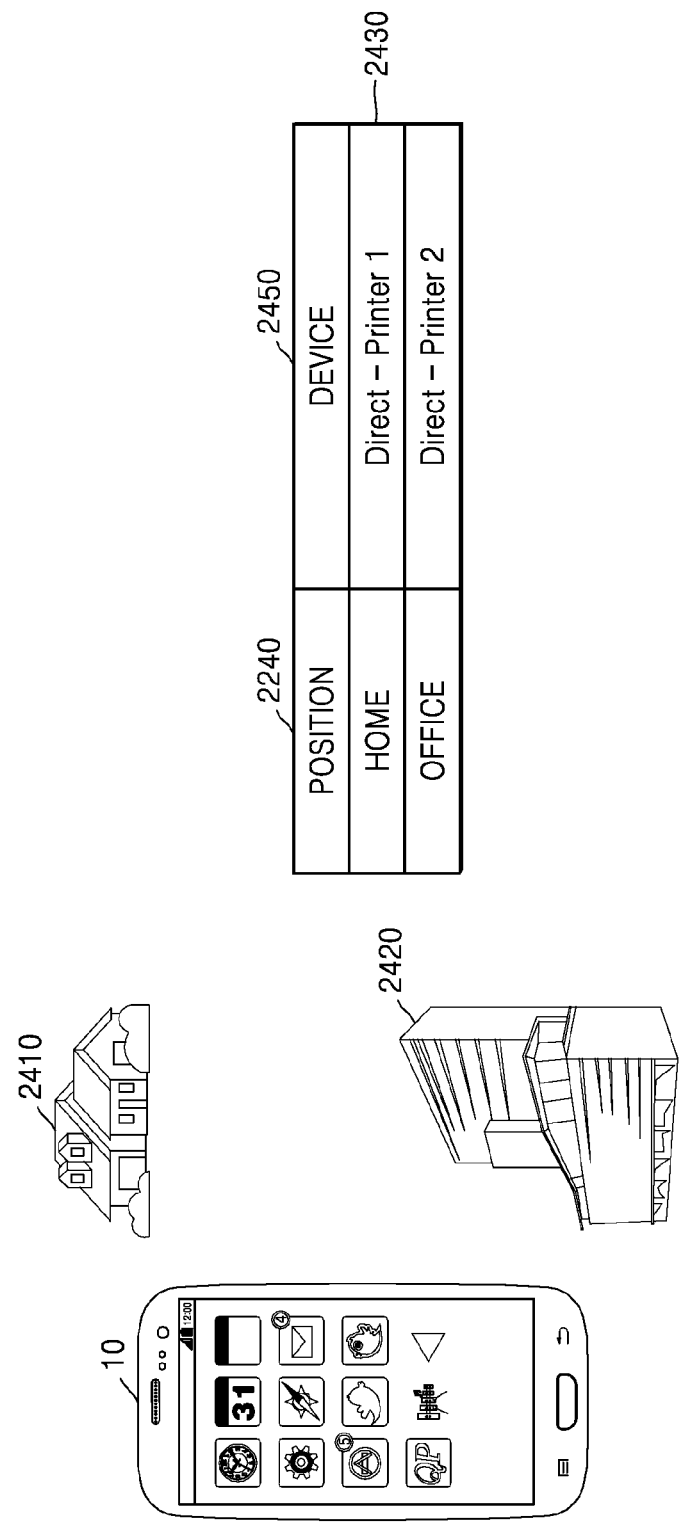
FIG. 24 is a diagram for explaining a process of performing a Wi-Fi Direct connection to a device adjacent to a mobile device by using position information stored in the mobile device, according to an embodiment.

FIG. 24 is a diagram for explaining a process of performing a Wi-Fi Direct connection to a device adjacent to a mobile device by using position information stored in the mobile device, according to an embodiment.

According to the present embodiment, it is assumed that a user has performed a Wi-Fi Direct connection to image forming apparatuses at home 2410 and the office 2420 by using the mobile device 10.

When the mobile device 10 performs a Wi-Fi Direct connection to image forming apparatuses at home 2410 and the office 2420, the mobile device 10 may automatically store position information of the image forming apparatuses with connection information of the image forming apparatuses. Here, the mobile device 10 may store position information of the image forming apparatuses by using information received via a GPS sensor, a Wi-Fi module, or a cellular network module of the mobile device 10.

For example, the mobile device 10 may obtain position information thereof regarding latitude and longitude by using a GPS sensor. Also, the mobile device 10 may connect to an AP therearound by using a Wi-Fi module and receive current position information thereof via a connected AP. Also, the mobile device 10 may obtain position information thereof by using information received from a peripheral base station connected by using a cellular network module. According to the present embodiment, for convenience of description, position information obtained in the mobile device 10 will be referred to as 'home' or 'office.' However, the exemplary embodiments are not limited thereto, and the mobile device 10 may obtain various types of position information and determine whether a current position of the mobile device 10 is position information indicating 'home' or 'office'.

Thus, when performing a Wi-Fi Direct connection to the image forming apparatus at 'home' (Direct-Printer 1) or the image forming apparatus at 'office' (Direct-Printer 2), the mobile device 10 may automatically obtain and store position information indicating 'home' and 'office' together with connection information of the image forming apparatuses (Direct-Printer 1 and Direct-Printer 2). The mobile device 10 may manage position information of devices based on a table 2430. For example, the mobile device 10 may store a position field 2440 as 'home' and a device field 2450 as Direct-Printer 1' at home as one row of the table 2430, and store a position field 2440 as 'office' and a device field 2450 as Direct-Printer 2' as another row of the table 2430.

Next, when the user takes the mobile device 10 to the home 2410 or the office 2420, the mobile device 10 determines a current position thereof. For example, the mobile device 10 may determine that a current position thereof is 'home' or 'office.' Here, the mobile device 10 may determine a device adjacent thereto by using the current position thereof and stored position information of adjacent devices. For example, the mobile device 10 may determine a current position thereof as 'home' and image forming apparatus (Direct-Printer 1) in the device field 2450 of the row where the position field 2440 is 'home' in the table 2430, as a device adjacent to the mobile device 10. The mobile device 10 may perform a Wi-Fi Direct connection to the image forming apparatus (Direct-Printer 1) by using connection information that is stored with position information of the image forming apparatus (Direct-Printer 1).

Thus, if the user takes the mobile device 10 to be adjacent to a device that has been Wi-Fi Direct connected to the mobile device 10, the mobile device 10 may automatically connect to the adjacent device via Wi-Fi Direct.

Figure 25:
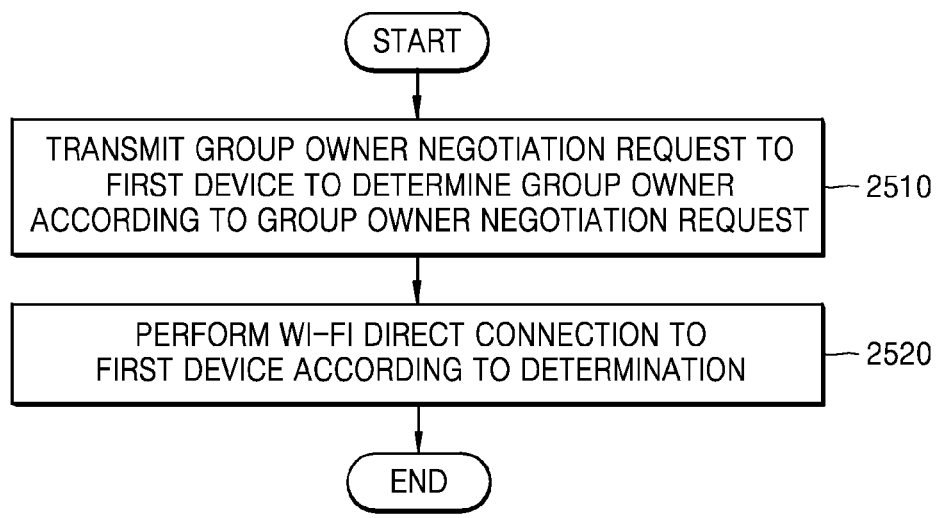
FIG. 25 is a detailed flowchart of operation 1630 of FIG. 16 according to an embodiment.

FIG. 25 is a detailed flowchart of operation 1630 of FIG. 16 according to an embodiment.

Referring to FIG. 25, in operation 2510, the mobile device 10 transmits a group owner negotiation request to the first device to determine a group owner according to the group owner negotiation request. That is, the mobile device 10 may transmit a group owner negotiation request to the first device, and the first device may receive a group negotiation request from the mobile device 10, respond to the group negotiation request, and determine which of the mobile device 10 and the first device is to be a group owner. The mobile device 10 and the first device exchange information indicating capability of each and determine which device is adequate to be a group owner based on the capability information.

In operation 2520, when a group owner is determined according to the group owner negotiation request, the mobile device 10 may perform a Wi-Fi Direct connection to the first device based on the determination. In detail, when the first device is determined as the group owner, the mobile device 10 becomes a client. Like an AP, the first device may approve a connection request from the client or end a connection. In contrast, when the mobile device 10 is determined as the group owner according to the group owner negotiation request, the first device becomes a client. Like an AP, the mobile device 10 may approve a connection request from the client or end a connection. That is, according to the determination, functions of the mobile device 10 and the first device may be respectively determined, and the mobile device 10 may perform a Wi-Fi Direct connection to the first device according to the determined functions.

Figure 26:
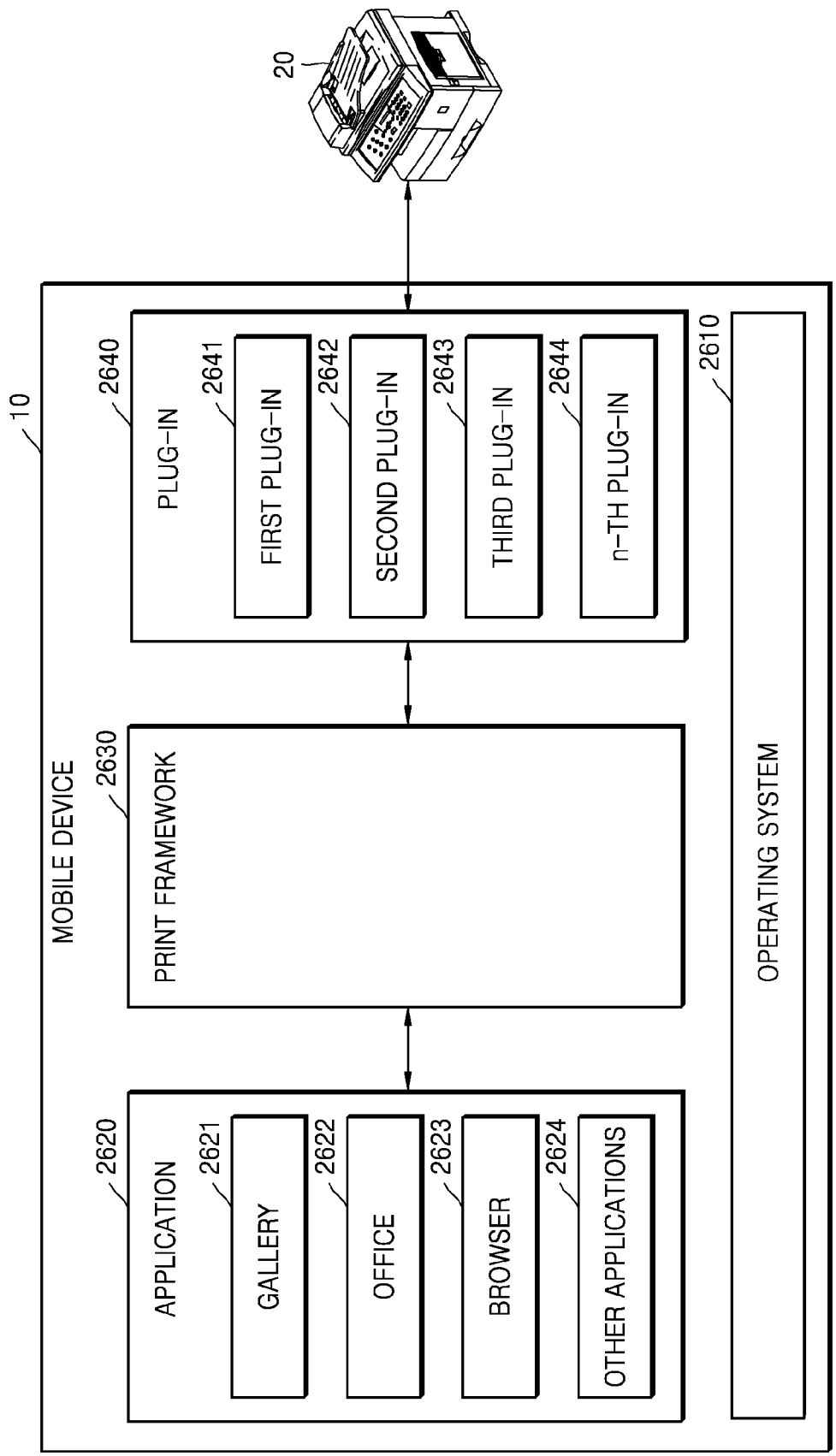
FIG. 26 is a block diagram illustrating a configuration of a mobile device according to an embodiment.

FIG. 26 is a block diagram illustrating a configuration of the mobile device according to an embodiment.

Referring to FIG. 26, the mobile device 10 may include an operating system 2610, an application 2620, a print framework 2630, and a plug-in 2640.

The operating system 2610 functions as an execution manager managing hardware and software of the mobile device 10. That is, the operating system 2610 may manage which software may use a hardware resource and how to use the hardware resource. Thus, the operating system 2610 may allocate hardware resources to the application 2620, the print framework 2630, and the plug-in 2640.

The application 2620 is software executed on the operating system 2610. In detail, the application 2620 is software that a user directly uses on the operating system 2610. The user may install the application 2620 that is desired, on the operating system 2610, execute the application 2620, and use functions provided by the application 2620.

For example, the application 2620 may include a gallery 2621, an office 2622, a browser 2623, and other applications 2624.

The print framework 2630 is a software package that provides a printing function so that the image forming apparatus 20 performs an image forming job about contents. In detail, the print framework 2630 refers to a set of application programming interfaces (APIs) that provide a printing function so that an image forming job about contents used in the application 2620 may be performed. For example, when performing an image forming job about contents used in the application 2620, the application 2620 may retrieve an API included in the print framework 2630 and generate an image forming job about contents by using the API. In particular, the print framework 2630 relays between the application 2620 and the plug-in 2640 so that an image forming job about contents used in the application 2620 passes the plug-in 2640 and is performed in the image forming apparatus 20.

The plug-in 2640 is a program developed by a manufacturer that manufactures the image forming apparatus 20 and generates a print command according to the image forming apparatus 20 so that the mobile device 10 connects to the image forming apparatus 20 manufactured by a manufacturer and the image forming apparatus 20 performs an image forming job about contents. The plug-in 2640 is provided by each manufacturer of an image forming apparatus and a user may download and install the plug-in 2640. For example, the plug-in 2640 may include a plurality of plug-ins provided by a manufacturer of each image forming apparatus, such as a first plug-in 2641, a second plug-in 2642, a third plug-in 2643, and an nth plug-in 2644.

The plug-in 2640 is connected to the print framework 2630 to operate so that the mobile device 10 is connected to the image forming apparatus 20, and when a request about an image forming job about contents is made by the application 2620 via the print framework 2630, the plug-in 2640 allows an image forming job about contents to be performed in the image forming apparatus 20 according to the request.

Figure 27A:
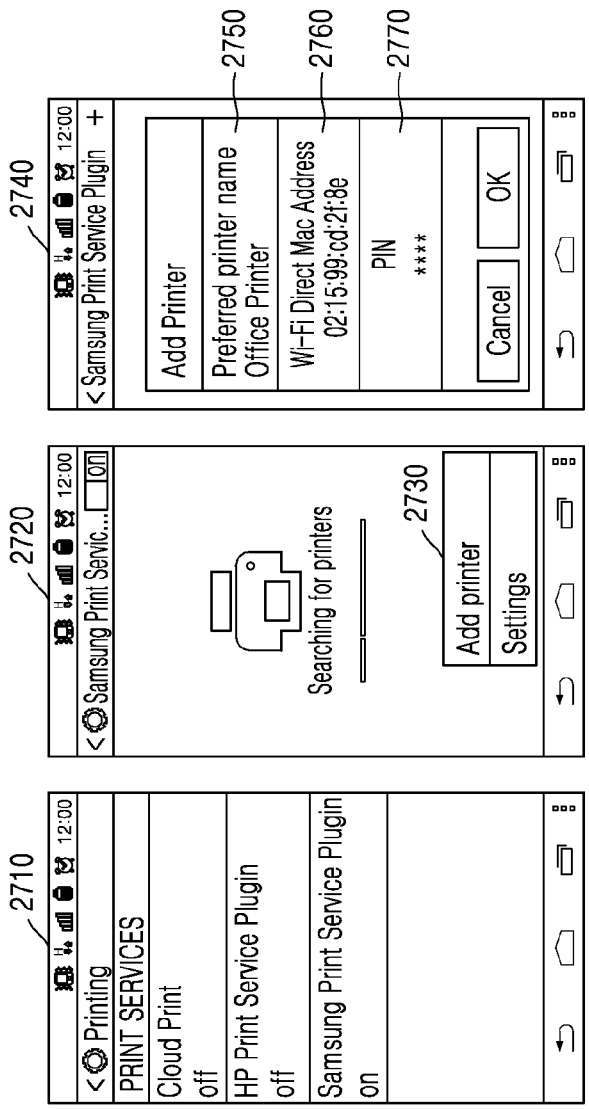
FIGS. 27A and 27B are diagrams for explaining a process of registering an image forming apparatus to a mobile device by using a plug-in program, according to an embodiment.
Figure 27B:
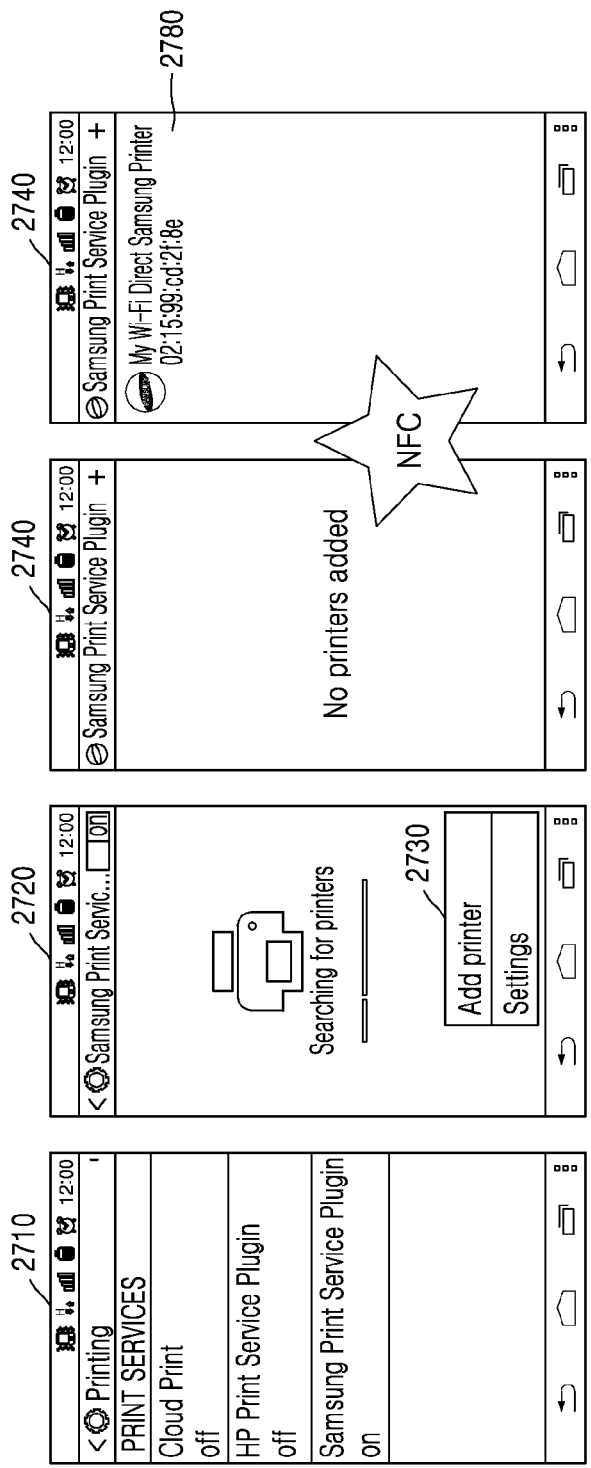

FIGS. 27A and 27B are diagrams for explaining a process of registering an image forming apparatus to a mobile device by using a plug-in program, according to an embodiment.

By using a plug-in program, a user may directly input connection information about the image forming apparatus 20 to which the mobile device 10 desires to Wi-Fi Direct connect or tag the mobile device 10 on an NFC tag attached to the image forming apparatus 20 to obtain connection information and register the image forming apparatus 20 to the plug-in program.

Referring to FIG. 27A, the user may register the image forming apparatus 20 by directly inputting connection information of the image forming apparatus 20 to the mobile device 10. The user selects one plug-in that is already installed, on a print screen 2710 of the mobile device 10. The mobile device 10 searches for a printer registered to the mobile device 10 and displays a found printer on the plug-in screen 2720.

The user selects a print add button 2730 on the plug-in screen 2720. Then, the user inputs a printer name 2750, a Wi-Fi Direct MAC address 2760, and a PIN 2770 on the printer register screen 2740. Then, when the user selects an 'OK' button, the image forming apparatus 20 may be registered to the plug-in program.

Referring to FIG. 27B, the user may tag the mobile device 10 on an NFC tag attached to the image forming apparatus 20 to obtain connection information from the NFC tag and register the image forming apparatus 20 by using the obtained connection information.

The user selects one plug-in that is already installed, on the print screen 2710 of the mobile device 10. The mobile device 10 searches for a printer registered to the mobile device 10 and displays a found printer on the plug-in screen 2720.

The user selects a printer add button 2730 on the plug-in screen 2720. In the printer register screen 2740, the user does not input connection information of the image forming apparatus 20 but tags the mobile device 10 on an NFC tag attached to the image forming apparatus 20. Connection information obtained via an NFC tag may include a printer name, a Wi-Fi Direct MAC address, and a Wi-Fi Direct PIN. The mobile device 10 may register the image forming apparatus 20 to the plug-in by using the obtained connection information. Here, the mobile device 10 may display an image forming apparatus 2780 to be registered, on the printer register screen 2740.

Figure 28:
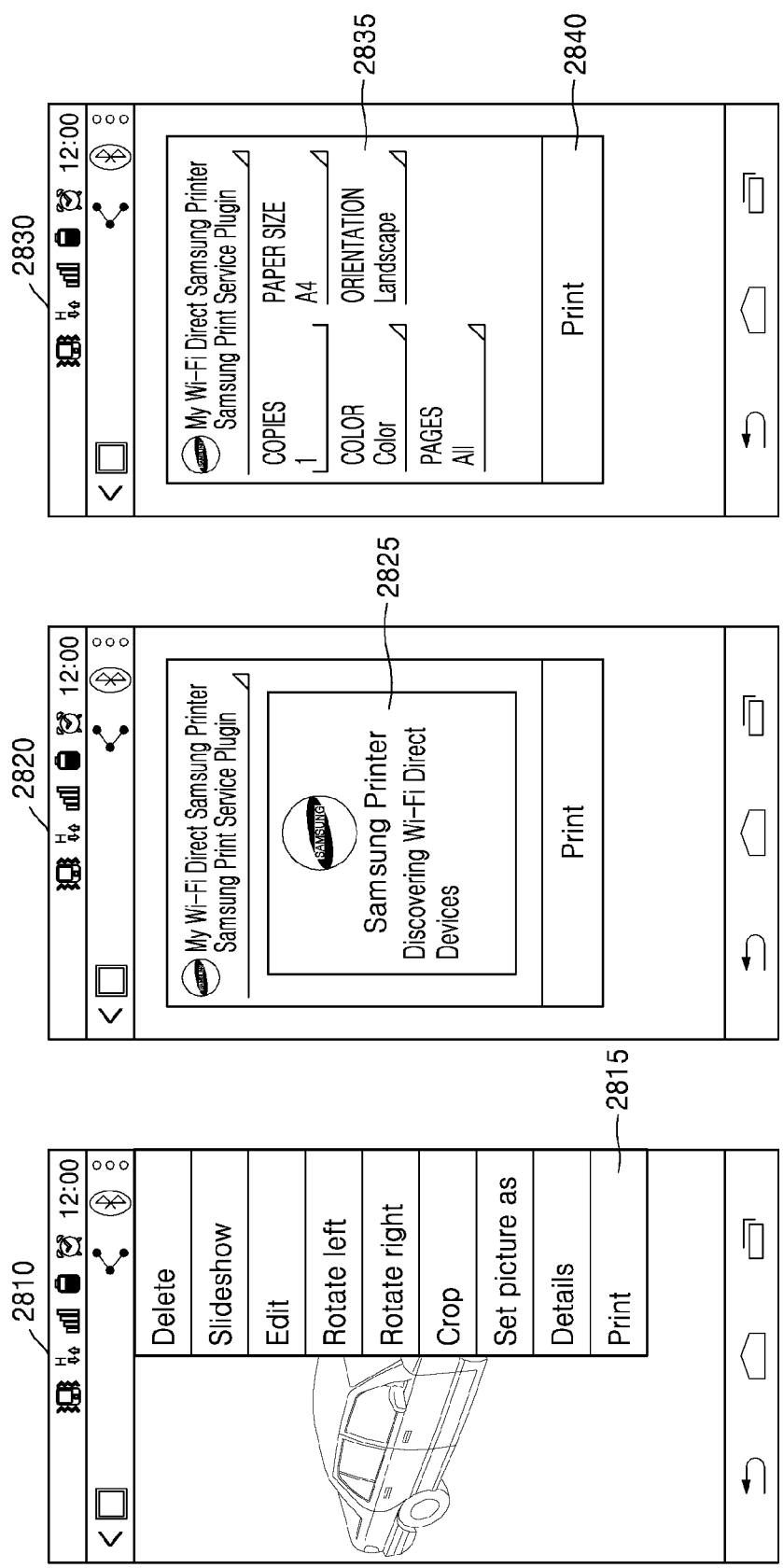
FIG. 28 is a diagram for explaining a process of requesting an image forming apparatus for an image forming job about a content on an application, by a user using a mobile device, according to an embodiment.

FIG. 28 is a diagram for explaining a process of requesting an image forming apparatus for an image forming job about a content on an application, by a user using a mobile device, according to an embodiment.

Referring to FIG. 28, the user executes an application 2810 on the mobile device 10, selects contents to be printed on the executed application 2810, and selects a print button 2815. For example, the user executes a gallery application on the mobile device 10, selects contents to be printed on the executed application, and selects a print button 2815.

The user may select a device to be Wi-Fi Direct connected, on a connection screen 2820. For example, the user may select the image forming apparatus 20 registered to the mobile device 10. When the user selects the registered image forming apparatus 20, the mobile device 10 performs a Wi-Fi Direct connection to the registered image forming apparatus 20. While the mobile device 10 is performing a Wi-Fi Direct connection to the image forming apparatus 20, a message 2825 indicating that connection is being conducted may be displayed on the mobile device 10.

When the mobile device 10 is connected to the image forming apparatus 20 via Wi-Fi Direct, the mobile device 10 receives capability and state information from the image forming apparatus 20, and the number of print pages, a paper size, colors, a paper direction, and printing pages, which are selectable on a print setup screen 2835, vary according to the capability and state information. A user selects, on the print setup screen 2835, the number of print pages, a paper size, colors, a paper direction, and printing pages, and selects a print button 2840. The mobile device 10 sends a printing request to the image forming apparatus 20 for contents via the print framework 2630 so that the image forming apparatus 20 may perform an image forming job about the contents.

Figure 29:
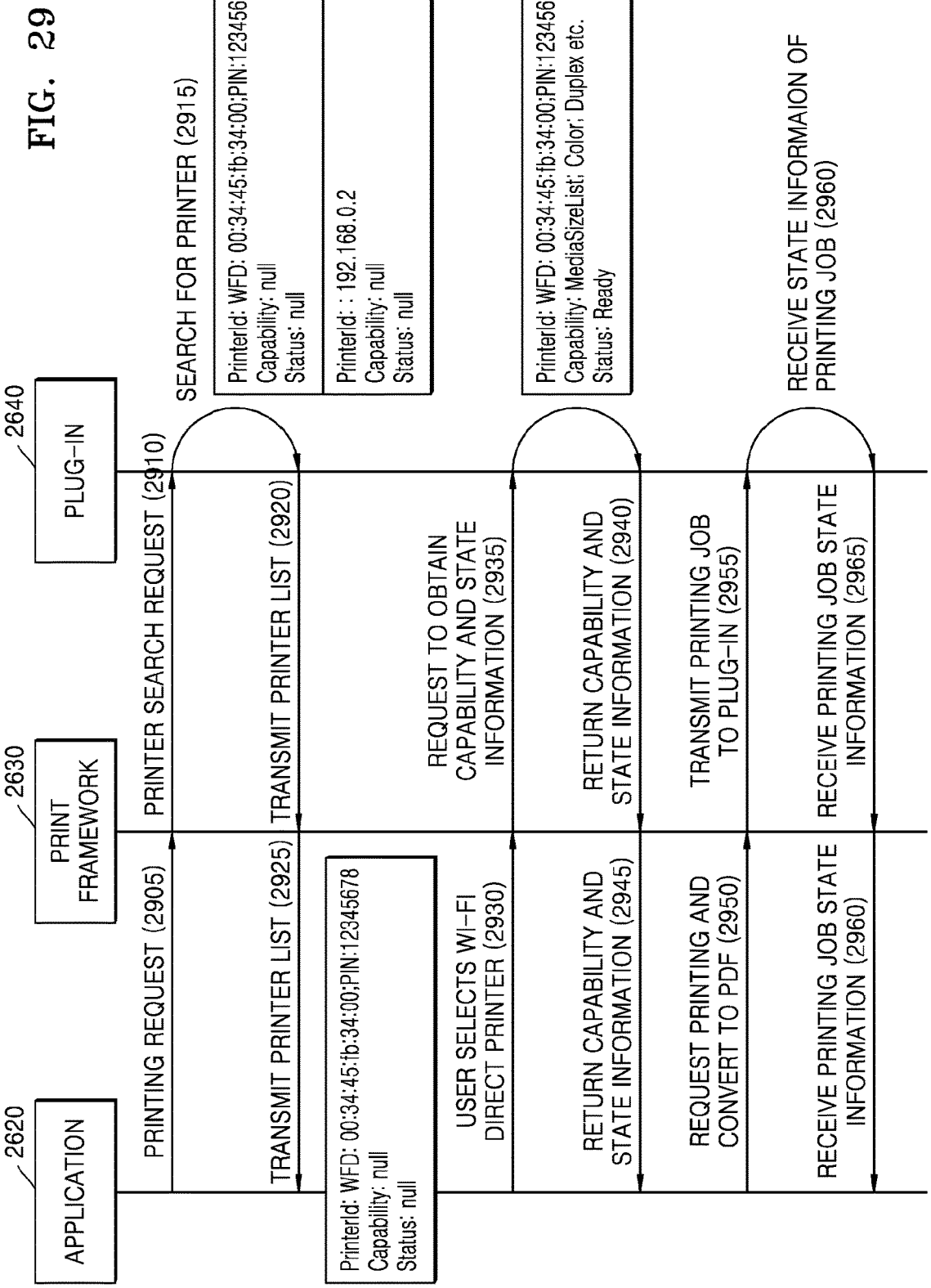
FIG. 29 is a diagram for explaining processes performed in a mobile device so that an image forming job about a content is performed in an image forming apparatus, according to an embodiment.

FIG. 29 is a diagram for explaining processes performed in a mobile device 10 so that an image forming job about contents may be performed in an image forming apparatus 20, according to an embodiment.

Referring to FIG. 29, in operation 2905, the application 2620 may send a printing request to the print framework 2630. Referring to FIG. 28 again, a user selects contents on the application 2810 and selects the print button 2815, and the application 2620 sends a printing request to the print framework 2630.

Referring to FIG. 29 again, in operation 2910, when the print framework 2630 receives a printing request from the application 2620, the print framework 2630 sends a printer search request to the plug-in 2640.

In operation 2915, when the plug-in 2640 receives the printer search request from the print framework 2630, the plug-in 2640 searches for registered printers. The plug-in 2640 sends a search request to devices therearound by using connection information of the registered printers, and may search, based on a response to the transmitted search request, only for printers that are adjacent to the mobile device 10.

For example, the plug-in 2640 may use printer registration information including PrinterID. For example, if a registered printer supports Wi-Fi Direct connection, and an Wi-Fi MAC address thereof is "00:34:45:fb:34:00" and PIN thereof is "12345678", PrinterID thereof may include "WFD: 00:34:45:fb:34:00; PIN:12345678." A printer supporting Wi-Fi connection may be registered to the plug-in 2640. For example, if a registered printer supports Wi-Fi connection and IP address thereof is "192.168.0.2," PrinterID thereof may include"192.168.0.2."

In operation 2920, the plug-in 2640 may send a printer list including found printers to the print framework 2630. For example, a list including printers supporting Wi-Fi connection and printers supporting Wi-Fi Direct connection, which are registered to the plug-in 2640, may be transmitted to the print framework 2630.

In operation 2925, when the print framework 2630 receives a printer list from the plug-in 2640, the print framework 2630 may send the printer list to the application 2620.

In operation 2930, the application 2620 may receive a printer list from the print framework 2630, and the user selects, on the application 2620, a Wi-Fi Direct printer that the user wishes to be Wi-Fi Direct connected to, among the printer list. Referring to FIG. 28 again, a Wi-Fi Direct printer that the user wishes to be Wi-Fi Direct connected to may be selected on the connection screen 2820.

Referring to FIG. 29 again, in operation 2935, when the print framework 2630 receives a user input for selecting a Wi-Fi Direct printer from the application 2620, the print framework 2630 sends a request for obtaining capability and state information of the selected Wi-Fi Direct printer, to the plug-in 2640, to which a corresponding printer is registered, in order to obtain information about capability and state of the selected Wi-Fi Direct printer.

In operation 2940, when the plug-in 2640 receives the request for obtaining capability and state information of the Wi-Fi Direct printer from the print framework 2630, the plug-in 2640 performs a Wi-Fi Direct connection to the Wi-Fi Direct printer and receives capability and state information from the Wi-Fi Direct printer. Wi-Fi Direct connection performed by the plug-in 2640 to the Wi-Fi Direct printer and receiving capability and state information from the Wi-Fi Direct printer will be described in detail later with reference to FIG. 30.

When the plug-in 2640 receives the capability and state information from the Wi-Fi Direct printer, the plug-in 2640 may return the capability and state information to the print framework 2630. Capability information may include information about various options of a printer corresponding to the capability information such as available paper sizes, whether colors are supported, and whether two-side printing is supported. State information refers to information indicating a state of a printer; for example, state information may include information about whether printing in a printer corresponding to the state information is possible or not.

In operation 2945, when the print framework 2630 receives capability and state information about a Wi-Fi Direct printer from the plug-in 2640, the print framework 2630 may return the capability and state information about the Wi-Fi Direct printer to the application 2620.

In operation 2950, when the application 2620 receives capability and state information about a Wi-Fi Direct printer from the plug-in 2640, the user selects a setting related to printing on the application 2620, and when the setting related to printing is selected, the application 2620 sends a printing request including contents based on the selected setting related to printing, to the print framework 2630. Referring to FIG. 28, a printing-related setting selectable on the print setup screen 2835 varies according to capability and state information about a Wi-Fi Direct printer sent from the print framework 2630, and thus, when the user performs a set up related to printing on the print set up screen 2835 and selects the print button 2840, the application 2620 may send a printing request to the print framework 2630.

In operation 2955, when the print framework 2630 receives a printing request from the application 2620, the print framework 2630 may convert contents into a PDF file and send a printing job including the converted contents, to the plug-in 2640. When the plug-in 2640 receives the printing job from the application 2620, the plug-in 2640 may send the printing job to the Wi-Fi Direct printer.

In operation 2960, the plug-in 2640 may receive state information of the printing job from the Wi-Fi Direct printer after sending the printing job to the Wi-Fi Direct printer. The plug-in 2640 may send the state information of the printing job to the print framework 2630. Also, when the print framework 2630 receives the state information of the printing job, the print framework 2630 may send the state information of the printing job to the application 2620. The application 2620 may receive the state information of the printing job from the print framework 2630 and display the received state information of the printing job to the user.

Figure 30:
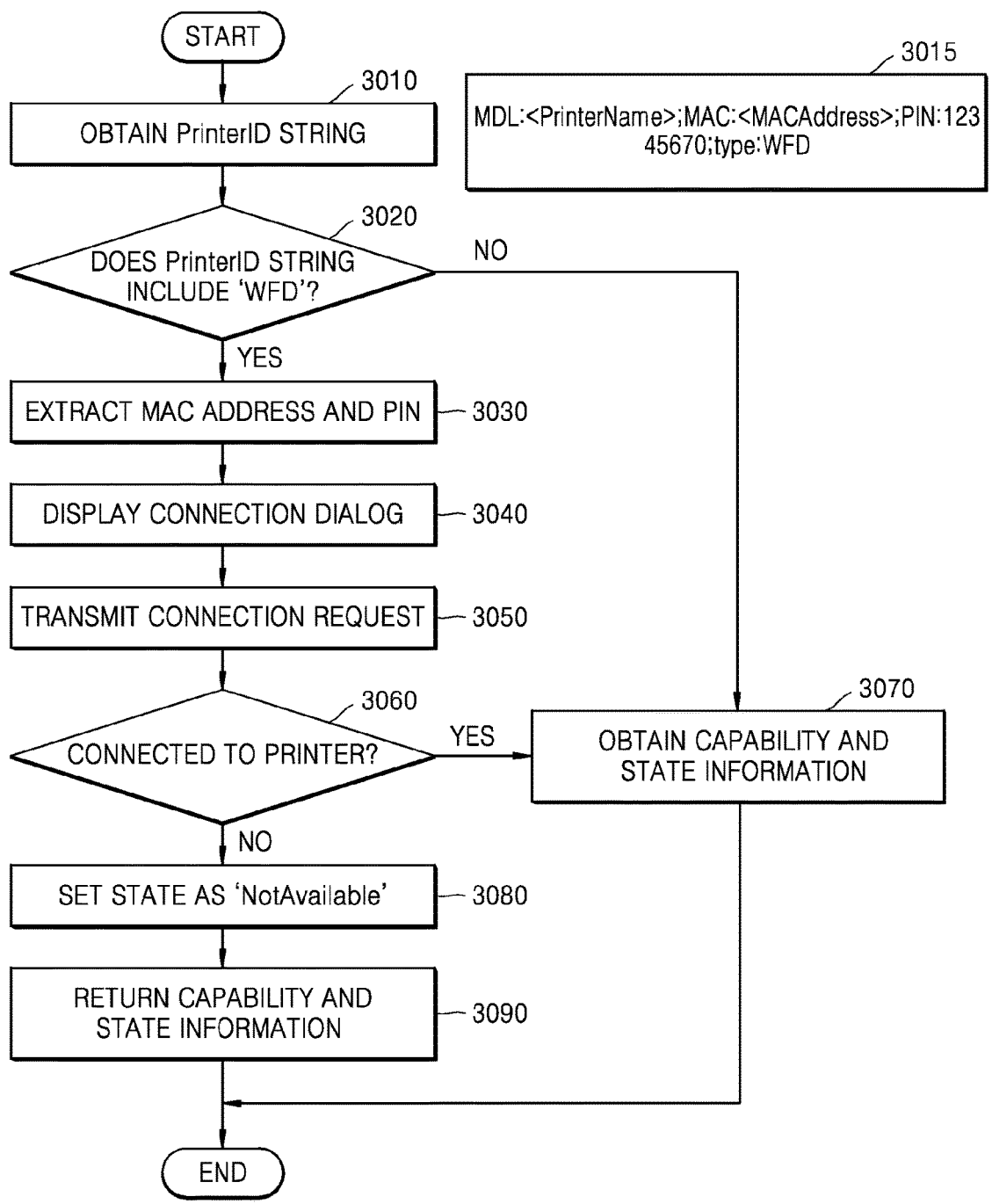
FIG. 30 is a detailed diagram for explaining a process of performing a Wi-Fi Direct connection to a device to be Wi-Fi Direct connected to a printer and obtaining capability and status information, via a plug-in, according to an embodiment.

FIG. 30 is a detailed diagram for explaining a process of performing a Wi-Fi Direct connection to a device to be Wi-Fi Direct connected to a printer and obtaining capability and status information, via a plug-in, according to an embodiment.

Referring to FIG. 30, in operation 3010, the plug-in 2640 may obtain a PrinterID string from a registered printer string 3015.

In operation 3020, the plug-in 2640 determines whether the PrinterID string includes WFD. That is, the plug-in 2640 determines whether a registered printer is a Wi-Fi Direct printer.

In operation 3030, the plug-in 2640 may extract a MAC address and a PIN from the Printer ID string.

In operation 3040, the plug-in 2640 may display a connection dialog.

In operation 3050, the plug-in 2640 may send a Wi-Fi Direct connection request to a registered Wi-Fi Direct printer by using the MAC address and the PIN.

In operation 3060, the plug-in 2640 determines whether the mobile device 10 is connected to the registered Wi-Fi Direct printer.

In operation 3070, if the mobile device 10 is connected to the registered Wi-Fi Direct printer, the plug-in 2640 may obtain capability and state information from the connected Wi-Fi Direct printer.

In operation 3080, if the mobile device 10 is not connected to the registered Wi-Fi Direct printer, the plug-in 2640 may set its state as 'NotAvailable.' Referring to FIG. 28, if the application 2620 receives state information set as 'NotAvailable,' the print button 2840 is inactivated on the print setup screen 2835 and thus the user may not send a printing request to the Wi-Fi Direct printer.

In operation 3090, the plug-in 2640 may return the capability and state information to the print framework 2630.

Figure 31:
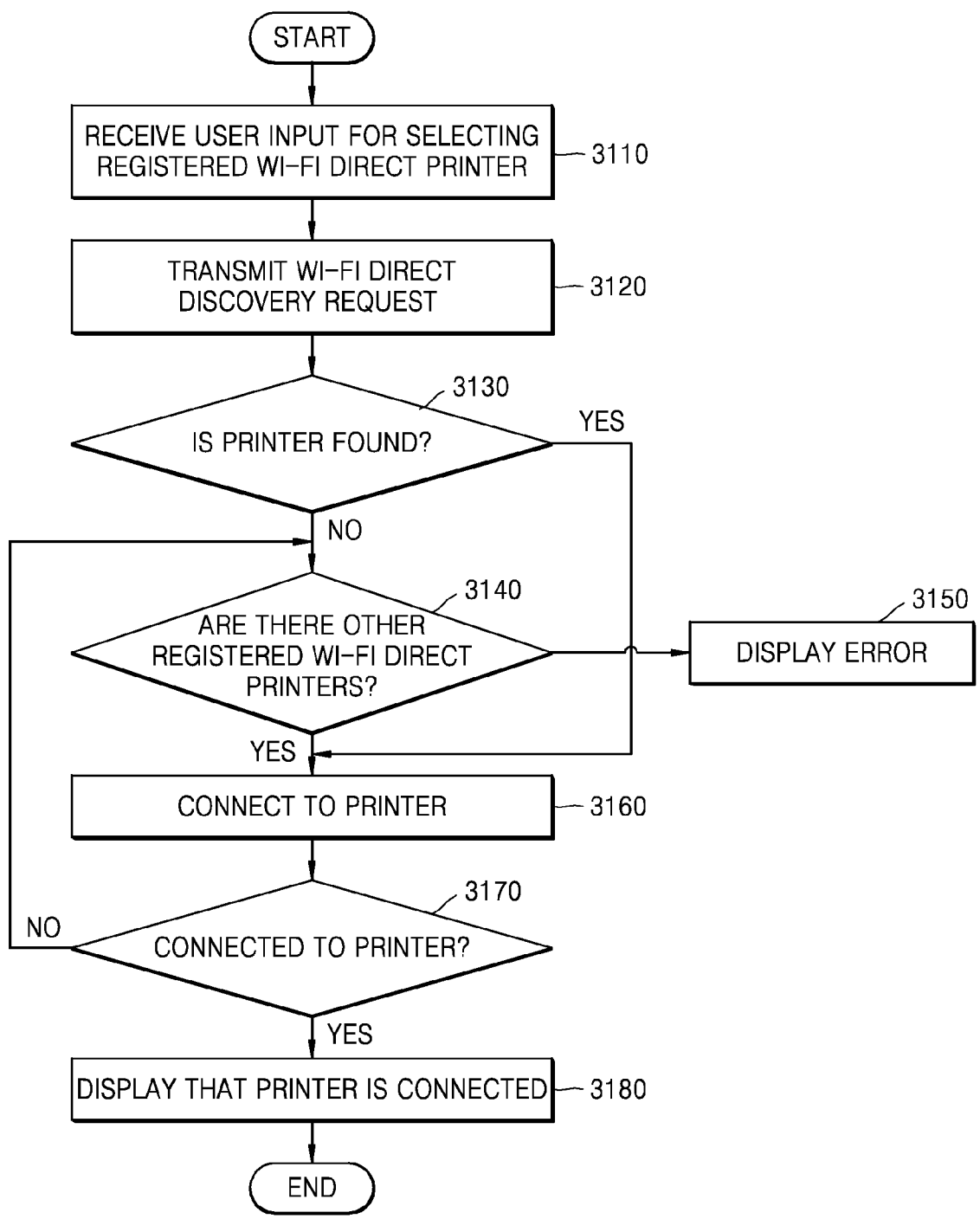
FIG. 31 is a flowchart of a method of performing a Wi-Fi Direct connection to a printer, by using a mobile device, according to an embodiment.

FIG. 31 is a flowchart of a method of performing a Wi-Fi Direct connection to a printer, by using a mobile device, according to an embodiment.

In operation 3110, the mobile device 10 may receive a user input for selecting a registered Wi-Fi Direct printer.

In operation 3120, the mobile device 10 may send a Wi-Fi Direct discovery request about a selected printer.

In operation 3130, the mobile device 10 determines whether a Wi-Fi Direct printer is found.

In operation 3140, if no Wi-Fi Direct printer is found, the mobile device 10 determines whether other registered Wi-Fi Direct printers are present.

In operation 3150, if it is determined that there is not another registered Wi-Fi Direct printer, the mobile device 10 may display an error indicating that connection is not possible.

In operation 3160, the mobile device 10 may attempt Wi-Fi Direct connection to the found Wi-Fi Direct printer.

In operation 3170, the mobile device 10 determines whether the mobile device 10 is Wi-Fi Direct connected to the found Wi-Fi Direct printer. If the mobile device 10 is not connected to the Wi-Fi Direct printer, the mobile device 10 determines whether there is another Wi-Fi Direct printer.

In operation 3180, if the mobile device 10 is Wi-Fi Direct connected to the Wi-Fi Direct printer, the mobile device 10 may display the Wi-Fi Direct printer that the mobile device 10 is connected to is connected.

Figure 32:
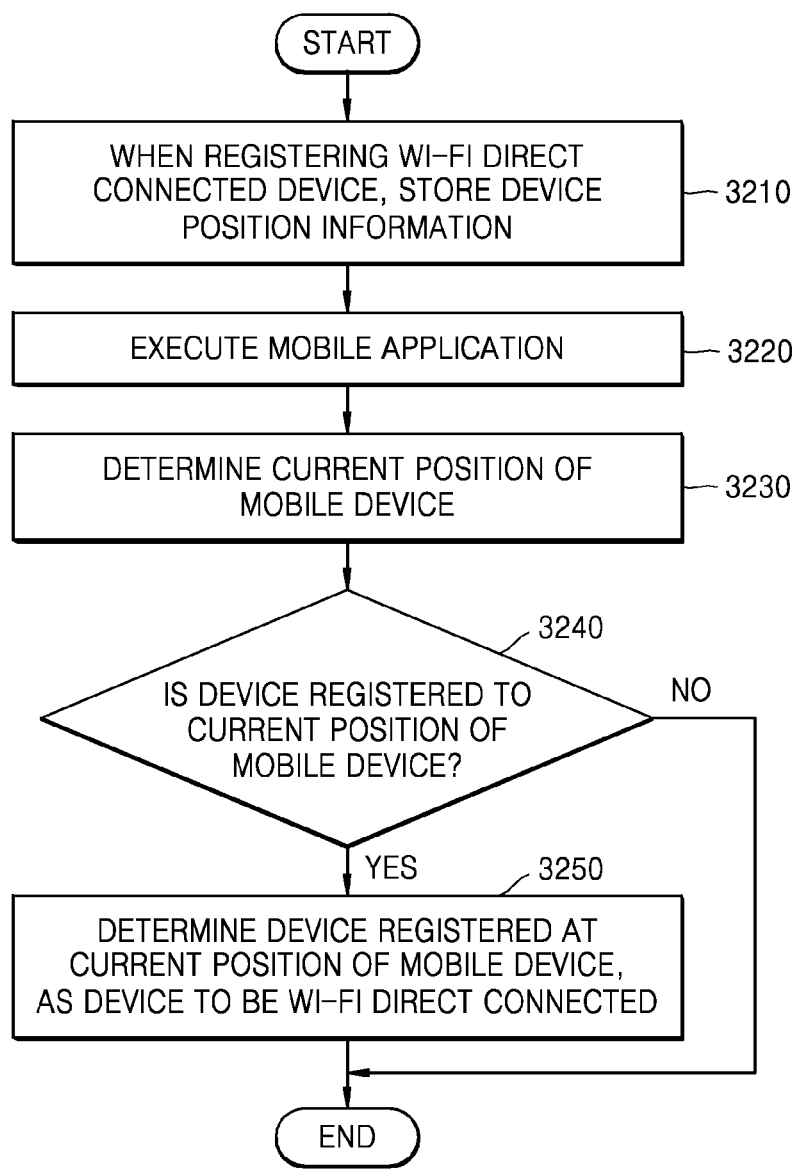
FIG. 32 is a flowchart of a method of determining a device to be Wi-Fi Direct connected to a mobile device based on position information, according to an embodiment.

FIG. 32 is a flowchart of a method of determining a device to be Wi-Fi Direct connected to a mobile device based on position information, according to an embodiment.

Referring to FIG. 32, in operation 3210, when registering a device to be Wi-Fi Direct connected to the mobile device 10, the mobile device 10 also stores position information of a device.

In operation 3220, the mobile device 10 executes a predetermined mobile application.

In operation 3230, the mobile device 10 determines a current position thereof.

In operation 3240, the mobile device 10 determines which device is registered to the current position of the mobile device 10. If it is determined that no device is registered to the current position of the mobile device 10, the mobile device 10 may end the mobile application-) without determining a device to be Wi-Fi Direct connected.

In operation 3250, if it is determined that there is at least one registered device at the current position of the mobile device 10, the mobile device 10 may determine the device registered at the current position, as a first device to be Wi-Fi Direct connected.

Various embodiments of the present disclosure can be written as computer programs that can be implemented in general-use digital computers that execute the programs using a computer-readable recording medium.

Examples of the computer-readable recording medium include read-only memory (ROM), random-access memory (RAM), CD-ROMs, magnetic tapes, floppy disks, optical data storage devices, etc. (e.g., transmission through the Internet).

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A method of performing a Wi-Fi Direct connection by a mobile device, the method comprising:
   determining, by the mobile device, a first device to which a Wi-Fi Direct connection is to be performed by
      determining a current position of the mobile device, and
      determining, as the first device, a device adjacent to the determined current position of the mobile device;
   determining, by the mobile device, whether the mobile device has been previously Wi-Fi Direct connected to the first device; and
   when the determining whether the mobile device has been previously Wi-Fi Directed connected to the first device determines that the mobile device has been previously Wi-Fi Direct connected to the first device, performing a Wi-Fi Direct connection by the mobile device to the first device based on connection information stored in the mobile device when the mobile device was previously Wi-Fi Direct connected to the first device,
   wherein the connection information of devices to which the mobile device has been previously Wi-Fi Direct connected has been automatically stored in the mobile device.

2. The method of claim 1, wherein the performing a Wi-Fi Direct connection comprises:
   determining a group owner by sending, by the mobile device, a group owner negotiation request to the first device; and
   performing, by the mobile device, a Wi-Fi Direct connection to the first device in accordance with the determined group owner.

3. The method of claim 1, wherein the connection information comprises at least one of a Wi-Fi Direct MAC address and a Wi-Fi Direct personal identification number (PIN).

4. The method of claim 1, wherein when the determining whether the mobile device has been previously Wi-Fi Directed connected to the first device determines that the mobile device has been previously Wi-Fi Direct connected to the first device, the performing a Wi-Fi Direct connection comprises:
when Wi-Fi Direct connection to the determined first device is not possible, determining a second device of a same type as the first device with which Wi-Fi Direct connection is to be performed, and
when the mobile device has been previously Wi-Fi Direct connected to the second device, automatically performing a Wi-Fi Direct connection by the mobile device to the second device based on connection information stored in the mobile device when the mobile device was previously Wi-Fi Direct connected to the second device.

5. The method of claim 1, wherein
the mobile device automatically stores, in the mobile device, position information of the devices along with connection information of the devices to which the mobile device has been previously Wi-Fi Direct connected, so that the mobile device stores position information of the first device together with connection information of the first device from when the mobile device was previously Wi-Fi Direct connected to the first device, and
the determining a device adjacent to the determined current position of the mobile device comprises determining a device adjacent to the current position of the mobile device based on the position information of the first device stored on the mobile device from when the mobile device was previously Wi-Fi Direct connected to the first device.

6. The method of claim 1, wherein
the determining a first device comprises, when a predetermined application is executed, determining a device to which the mobile device was previously Wi-Fi Direct connected during a previous execution of the predetermined application as the first device.

7. The method of claim 6, wherein
the mobile device automatically stores, in the mobile device, information about identifiers of devices and types of performed connections of devices to which the mobile device has been previously Wi-Fi Direct connected, and
the determining a first device determines the first device based on information about an identifier of the first device and a type of performed connection stored in the mobile device when the mobile device was previously Wi-Fi Direct connected to the first device.

8. The method of claim 1, wherein the stored connection information is obtained from a near field communication (NFC) tag or is input by a user.

9. A mobile device comprising:
a storage;
a wireless interface; and
a controller that
automatically stores, in the storage, connection information of devices to which the mobile device has been previously Wi-Fi Direct connected,
determines a first device to which a Wi-Fi Direct connection is to be performed by
determining a current position of the mobile device supporting Wi-Fi Direct, and
determining, as the first device, a device adjacent to the determined current position of the mobile device,
determines whether the mobile device has been previously Wi-Fi Direct connected to the first device, and,
when the controller determines that the mobile device has been previously Wi-Fi Direct connected to the first device, controls the wireless interface such that Wi-Fi Direct connection to the first device is performed based on connection information stored in the storage when the mobile device was previously Wi-Fi Direct connected to the first device.

10. The mobile device of claim 9, wherein the connection information comprises at least one of a Wi-Fi Direct MAC address and a Wi-Fi Direct personal identification number (PIN).

11. The mobile device of claim 9, wherein
the controller determines whether a Wi-Fi Direct connection to the first device is possible, and
when the controller determines that a Wi-Fi Direct connection to the first device is not possible, the controller
determines a second device of a same type as the first device with which Wi-Fi Direct connection is to be performed, and
when the mobile device has been previously Wi-Fi Directed connected to the second device, automatically controls the wireless interface such that Wi-Fi Direct connection to the second device is performed based on connection information stored in the storage when the mobile device was previously Wi-Fi Directed connected to the second device.

12. The mobile device of claim 9, wherein the controller automatically stores, in the storage, position information of the devices to which the mobile device has been previously Wi-Fi Direct connected, so that the controller stores position information of the first device in the storage from when the mobile device was previously Wi-Fi Direct connected to the first device, and
determines a device adjacent to the determined current position of the mobile device based on the position information of the first device stored in the storage.

13. The mobile device of claim 9, wherein, to determine a first device, when a predetermined application is being executed, the controller determines a device to which the mobile device was previously Wi-Fi Direct connected during a previous execution of the predetermined application as the first device.

14. The mobile device of claim 13, wherein the controller automatically stores, in the storage, information about identifiers of devices and types of performed connections of devices to which the mobile device has been previously Wi-Fi Direct connected, and
determines the first device based on information about an identifier of the first device and a type of performed connection stored in the storage when the mobile device was previously Wi-Fi Direct connected to the first device.

15. A non-transitory computer-readable recording medium having embodied thereon a computer program for executing the method of claim 1.

16. An image forming apparatus comprising:
a controller;
a network interface;
a memory comprising instructions that, when executed by the controller, perform operations comprising:
receiving a Wi-Fi Direct connection request from an external device;

determining whether a maximum number of connectable devices are connected to the image forming apparatus;

when the determining whether a maximum number of connectable devices are connected to the image forming apparatus determines that the maximum number of connectable devices are connected to the image forming apparatus, determining a device to be disconnected among the connected devices, based on connection state information of the connected devices;

disconnecting the device determined to be disconnected; and establishing a connection to the external device.

17. The image forming apparatus of claim 16, wherein the connection state information comprises at least one of time when the connected devices are connected to the image forming apparatus and content of jobs that are performed via connection to the image forming apparatus.

18. The image forming apparatus of claim 16, wherein the determining a device to be disconnected among the connected devices comprises:

updating the connection state information based on the connection request received from the connected devices or exchanged data;

storing the updated connection state information;

when it is determined that the maximum number of connectable devices are connected, determining the device to be disconnected among the connected devices, based on the stored updated connection state information of the connected devices.

19. The image forming apparatus of claim 16, further comprising a display, and wherein the instructions that, when executed by the controller, perform the operations further comprise:

when it is determined that there is no device to be disconnected among the connected devices, controlling the display to display a message informing that there is no device to be disconnected.

20. The image forming apparatus of claim 17, wherein the determining a device to be disconnected among the connected devices comprises at least one of:

determining a first device connected to the image forming apparatus for a longest time, as the device to be disconnected; and determining a second device that performs a job, having a lower priority than a priority of at least one other job, via the image forming apparatus, as the device to be disconnected.

* * * * *